United States Patent
Hidaka

(10) Patent No.: US 10,222,940 B2
(45) Date of Patent: Mar. 5, 2019

(54) HANDHELD TERMINAL, IMAGE GENERATION METHOD, AND NON-TRANSITORY COMPUTER-READABLE MEDIUM CONTAINING PROGRAM

(71) Applicant: NEC Corporation, Minato-ku, Tokyo (JP)

(72) Inventor: Shinji Hidaka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 548 days.

(21) Appl. No.: 14/760,110

(22) PCT Filed: Feb. 25, 2014

(86) PCT No.: PCT/JP2014/000970
§ 371 (c)(1),
(2) Date: Jul. 9, 2015

(87) PCT Pub. No.: WO2014/136400
PCT Pub. Date: Sep. 12, 2014

(65) Prior Publication Data
US 2015/0355791 A1     Dec. 10, 2015

(30) Foreign Application Priority Data
Mar. 5, 2013    (JP) ................................. 2013-042735

(51) Int. Cl.
*G06F 3/0482*    (2013.01)
*G06F 1/16*    (2006.01)
(Continued)

(52) U.S. Cl.
CPC .......... *G06F 3/0482* (2013.01); *G06F 1/1641* (2013.01); *G06F 1/1647* (2013.01);
(Continued)

(58) Field of Classification Search
CPC .... G06F 3/0482; G06F 3/04842; G06F 3/147; G06F 3/1431; G06F 3/0488;
(Continued)

(56) References Cited

U.S. PATENT DOCUMENTS

| 2005/0202868 A1 | 9/2005 | Sawano et al. |
| 2007/0234222 A1 | 10/2007 | Yamaguchi et al. |

(Continued)

FOREIGN PATENT DOCUMENTS

| CN | 101046736 A | 10/2007 |
| CN | 101796526 A | 8/2010 |

(Continued)

OTHER PUBLICATIONS

Japanese Office Action for JP Application No. 2015-504158 dated Aug. 1, 2017 with English Translation.

(Continued)

*Primary Examiner* — John T Repsher, III

(57) ABSTRACT

A mobile terminal apparatus can generate data indicating a screen displayed on a display unit using software depending on selection states of the display unit. A first display unit and a second display unit display images. The apparatus causes at least one of the first display unit and the second display unit to display a content. The apparatus selects one or more of the first display unit and the second display unit. The apparatus acquires screen data indicating a screen displayed on the selected display unit. The apparatus generates image data based on the acquired screen data.

10 Claims, 22 Drawing Sheets

(51) Int. Cl.
*G06F 3/0484* (2013.01)
*G06F 3/147* (2006.01)
*G06F 3/14* (2006.01)
*G06F 3/0488* (2013.01)
*H04N 21/442* (2011.01)
*H04N 21/658* (2011.01)
*H04N 21/61* (2011.01)
*H04N 21/239* (2011.01)
*H04N 5/232* (2006.01)

(52) U.S. Cl.
CPC ........ *G06F 3/0488* (2013.01); *G06F 3/04842* (2013.01); *G06F 3/147* (2013.01); *G06F 3/1431* (2013.01); *G06F 3/1454* (2013.01); *H04N 21/2393* (2013.01); *H04N 21/44209* (2013.01); *H04N 21/6131* (2013.01); *H04N 21/6581* (2013.01); *G06F 3/1446* (2013.01); *G09G 2300/026* (2013.01); *G09G 2340/0421* (2013.01); *H04N 5/23293* (2013.01)

(58) Field of Classification Search
CPC .... G06F 3/1454; G06F 3/1446; G06F 1/1641; G06F 1/1647; H04N 21/44209; H04N 21/6581; H04N 21/6131; H04N 21/2393; H04N 5/23293; G09G 2340/0421; G09G 2300/026
USPC ........................................................ 715/761
See application file for complete search history.

(56) References Cited

U.S. PATENT DOCUMENTS

| | | |
|---|---|---|
| 2008/0113793 A1 | 5/2008 | Miyamoto et al. |
| 2009/0063986 A1 | 3/2009 | Camenisch et al. |
| 2010/0171716 A1 | 7/2010 | Ikeda et al. |
| 2011/0154248 A1 | 6/2011 | Tsuruoka |
| 2011/0187655 A1 | 8/2011 | Min et al. |
| 2011/0187662 A1 | 8/2011 | Lee et al. |
| 2011/0193806 A1 | 8/2011 | Kim et al. |
| 2011/0209101 A1* | 8/2011 | Hinckley .............. G06F 1/1647 715/863 |
| 2012/0072866 A1* | 3/2012 | Imai ...................... G06F 9/4443 715/804 |
| 2012/0229374 A1 | 9/2012 | Kobayashi et al. |
| 2012/0274540 A1 | 11/2012 | Inami et al. |
| 2013/0113749 A1 | 5/2013 | Miyahara |

FOREIGN PATENT DOCUMENTS

| | | |
|---|---|---|
| CN | 101866234 A | 10/2010 |
| CN | 102023834 A | 4/2011 |
| CN | 102141851 A | 8/2011 |
| CN | 102742168 A | 10/2012 |
| CN | 102754066 A | 10/2012 |
| EP | 2204729 A2 | 7/2010 |
| JP | H09-102918 A | 4/1997 |
| JP | 2005-185659 A | 7/2005 |
| JP | 2006-314610 A | 11/2006 |
| JP | 2007-082223 A | 3/2007 |
| JP | 2012-190297 A | 10/2012 |
| WO | 2005/089895 A1 | 9/2005 |
| WO | 2008/016031 A1 | 2/2008 |
| WO | 2012/039235 A1 | 3/2012 |

OTHER PUBLICATIONS

International Search Report for PCT Application No. PCT/JP2014/000970, dated Apr. 1, 2014.
"Sumaho de Kachikachi Dekiru! "Oritatami no N"" ga Hanatsu, Masaka no Sotogawa 2 Gamen no Oritatami Smartphone, 'MEDIAS W N-05E o Shashin to Doga de Check [Report]' Jan. 22, 2013, retrieval date Mar. 20, 2014.
Yoichi Hiraga, 2 Gamen de Kitto Hakadoru: Shashin to Doga de Kaisetsu suru 'MEDIAS W N-05E (2/3)', Jan. 23, 2013, retrieval date Mar. 20, 2014.
Extended European Search Report for EP Application No. EP14760340.1 dated Sep. 27, 2016.
Chinese Office Action for CN Application No. 201480012077.9 dated Jun. 1, 2017 with English Translation.
Chinese Office Action for CN Application No. 201480012077.9 dated Jan. 22, 2018 with English Translation.

* cited by examiner

HANDHELD TERMINAL, IMAGE GENERATION METHOD, AND NON-TRANSITORY COMPUTER-READABLE MEDIUM CONTAINING PROGRAM

This application is a National Stage Entry of PCT/JP2014/000970 filed on Feb. 25, 2014, which claims priority from Japanese Patent Application 2013-042735 filed on Mar. 5, 2013, the contents of all of which are incorporated herein by reference, in their entirety.

TECHNICAL FIELD

The present invention relates to a mobile terminal apparatus, an image generation method and a non-transitory computer readable medium storing a program, and in particular, to a mobile terminal apparatus, an image generation method and a non-transitory computer readable medium storing a program that generate image data indicating a screen which is displayed.

BACKGROUND ART

In the art of a mobile terminal apparatus such as a mobile phone or a smart phone, it is possible to enhance the convenience of users by enlarging the size of a screen. However, when the size of the screen is too enlarged, the size of the whole mobile terminal apparatus becomes too large, and thereby there is a possibility that carrying of the mobile terminal apparatus becomes inconvenient. It is possible to prevent carrying of the mobile terminal apparatus from becoming inconvenient by setting up more than one screen (i.e., window) in the mobile terminal apparatus and making the mobile terminal apparatus a foldable or slidable structure.

On the one hand, there is a technology to generate image data indicating the screen which is displayed on a display device and to store the image data, such as a screen shot, screen capturing, a screen dump or a print screen. This technology is also applied to the mobile phone and the like.

In relation to the above technology, Patent Literature 1 discloses a mobile phone which displays the program contents on a first display unit and displays an image capture button, on a second display unit, to capture an image of the program contents displayed on the first display unit with an image capture unit.

Moreover, Patent Literature 2 discloses a mobile phone which can capture at least one image of an image input by a first camera unit, an image input by a second camera unit and a received image and store it in a store unit as a static image or a moving image, and can capture a plurality of images to synthesize one image from their images and store it.

CITATION LIST

Patent Literature

Patent Literature 1: WO 2008/016031
Patent Literature 2: Japanese Unexamined Patent Application Publication No. 2007-82223

SUMMARY OF INVENTION

Technical Problem

The technology of Patent Literature 1 simply captures the image of the contents displayed on one display unit. Furthermore, the technology of Patent Literature 2, when the images taken by two cameras are displayed in two screens, simply captures these images to synthesize one image from these images. That is, in the technologies of Patent Literature 1 and Patent Literature 2, it is difficult to select the display unit whose screen (i.e., image) should be captured to generate data indicating the screen (i.e., image) displayed in the selected display unit when the contents are displayed on at least one of a plurality of display units using application software.

The present invention has been made to solve the above-mentioned problem, and an object of the present invention is to provide a mobile terminal apparatus, an image generation method and a non-transitory computer readable medium storing a program which can easily generate data indicating a screen displayed on the display unit using software depending on selection states of the display unit.

Solution to Problem

A mobile terminal apparatus according to the present invention includes a plurality of display unit that display images; display control means for causing at least one of the plurality of the display units to display a content by using one or more software; selection means for selecting one or more of the plurality of the display units; display-screen acquisition means for acquiring screen data indicating a screen displayed on the display unit selected by the selection means; and image-data generation means for generating image data based on the screen data acquired by the display-screen acquisition means.

An image generation method according to the present invention includes causing at least one of a plurality of display units, that are provided in a mobile terminal apparatus and display images, to display a content by using one or more software; selecting one or more of the plurality of the display units; acquiring screen data indicating a screen displayed on the selected display unit; and generating image data based on the acquired screen data.

A program stored in non-transitory computer readable medium causes a computer of a mobile terminal apparatus to execute a display step control means of causing at least one of the plurality of the display units, that are provided in the mobile terminal apparatus and display images, to display a content by using one or more software; a selection step of selecting one or more of the plurality of the display units; a display-screen acquisition step of acquiring screen data indicating a screen displayed on the display unit selected in the selection step; and an image-data generation step of generating image data based on the screen data acquired in the display-screen acquisition step.

Advantageous Effects of Invention

According to the present invention, it is possible to provide a mobile terminal apparatus, an image generation method and a non-transitory computer readable medium storing a program which can easily generate data indicating a screen displayed on the display unit using software depending on selection states of the display unit.

DESCRIPTION OF EMBODIMENTS

Outline of the Exemplary Embodiments According to the Present Invention

Figure 1:
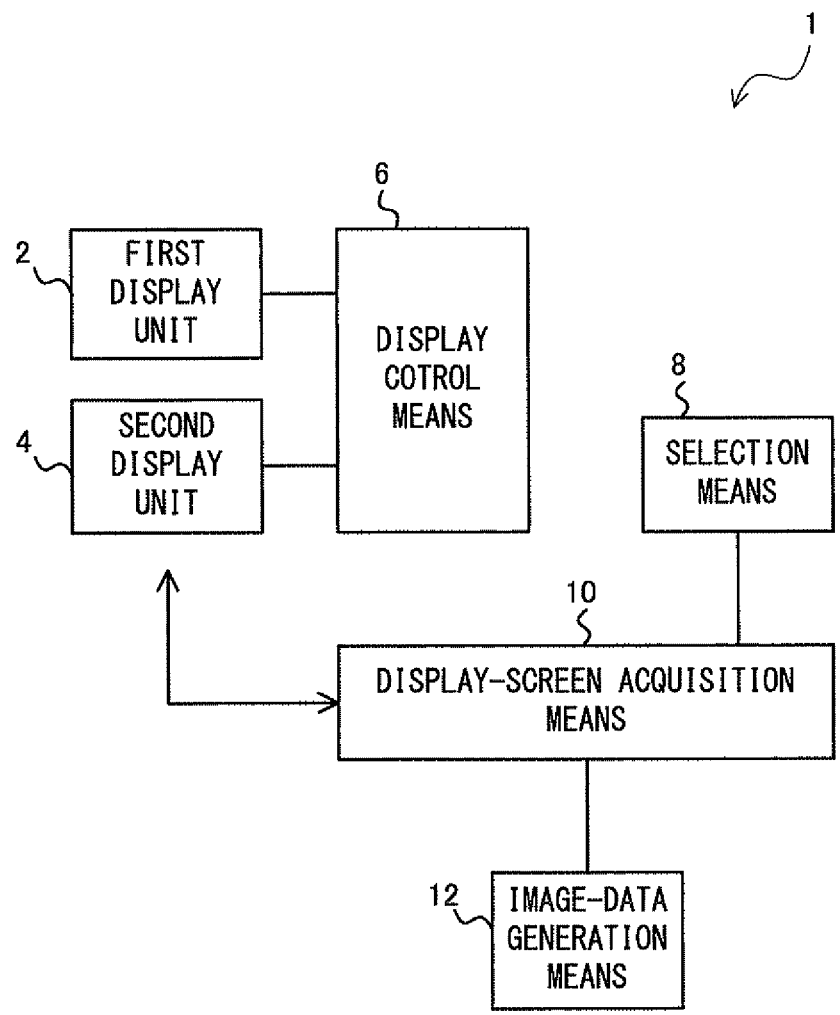
FIG. 1 is a diagram showing an outline of a mobile terminal apparatus according to exemplary embodiments of the present invention.

Before an explanation of exemplary embodiments is given, an outline of a mobile terminal apparatus according to the exemplary embodiments of the present invention is explained with reference to FIG. 1. FIG. 1 is a diagram showing an outline of a mobile terminal apparatus 1 according to the exemplary embodiments of the present invention. As shown in FIG. 1, the mobile terminal apparatus 1 includes a first display unit 2 and a second display unit 4, which are multiple display units, a display control means 6, a selection means 8, a display-screen acquisition means 10 and an image-data generation means 12.

The first display unit 2 and the second display unit 4 display images. The display control means 6 causes at least one of the first display unit 2 and the second display unit 4 to display a content by using one or more software. The selection means 8 selects one or more of the first display unit 2 and the second display unit 4. The display-screen acquisition means 10 acquires screen data indicating a screen displayed on the display unit selected by the selection means 8. The image-data generation means 12 generates image data based on the screen data acquired by the display-screen acquisition means 10.

According to the mobile terminal apparatus 1 according to the exemplary embodiments of the present invention, it is possible to easily generate data indicating a screen displayed on the display unit using software depending on selection states of the display unit. Additionally, according to a method performed by the mobile terminal apparatus 1 or a program which can be incorporated in the mobile terminal apparatus 1, it is also possible to easily generate data indicating the screen displayed on the display unit using software depending on selection states of the display unit.

First Exemplary Embodiment

Figure 2:
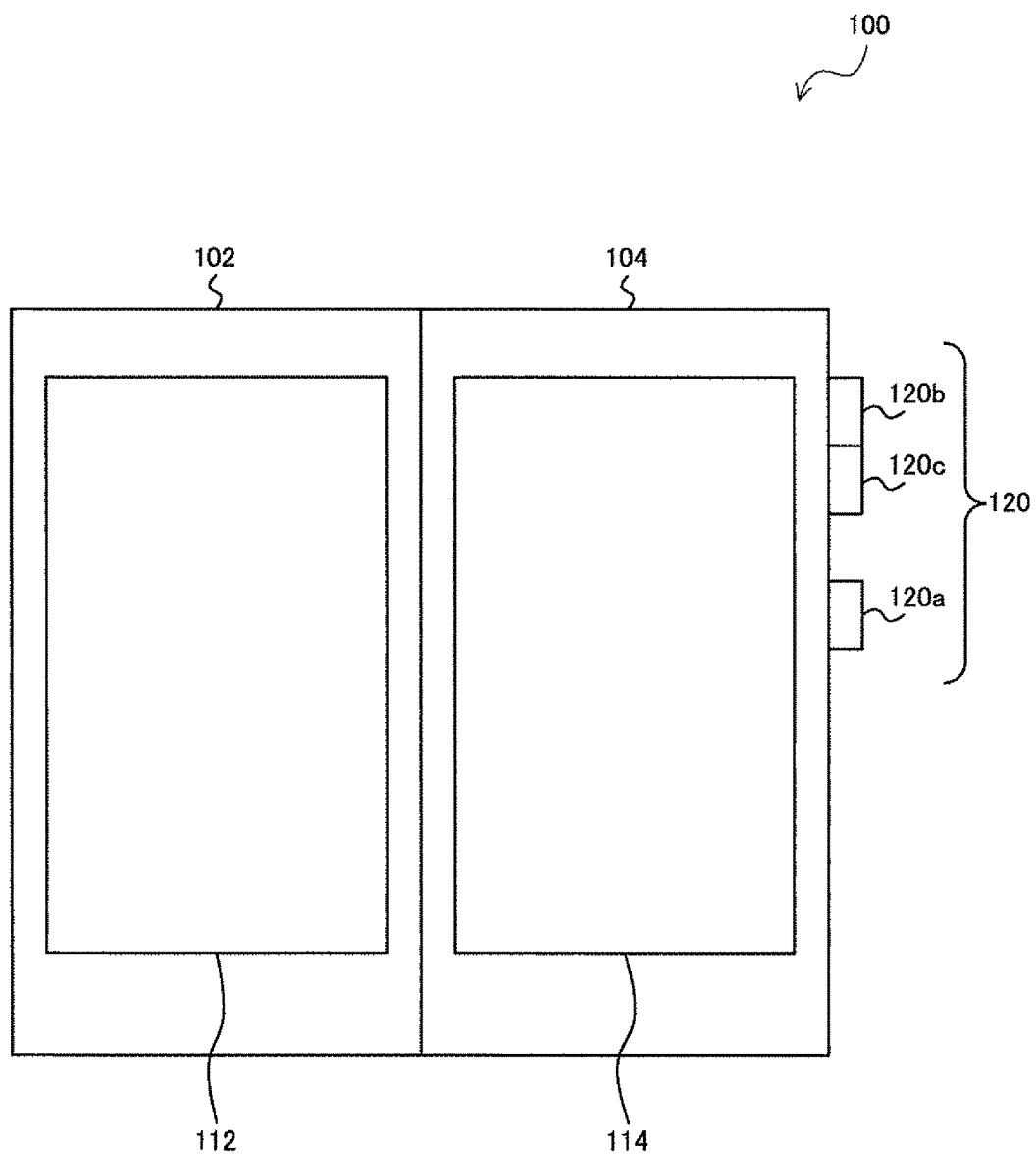
FIG. 2 is a plan view showing an appearance of a mobile terminal apparatus according to a first exemplary embodiment.
Figure 3:
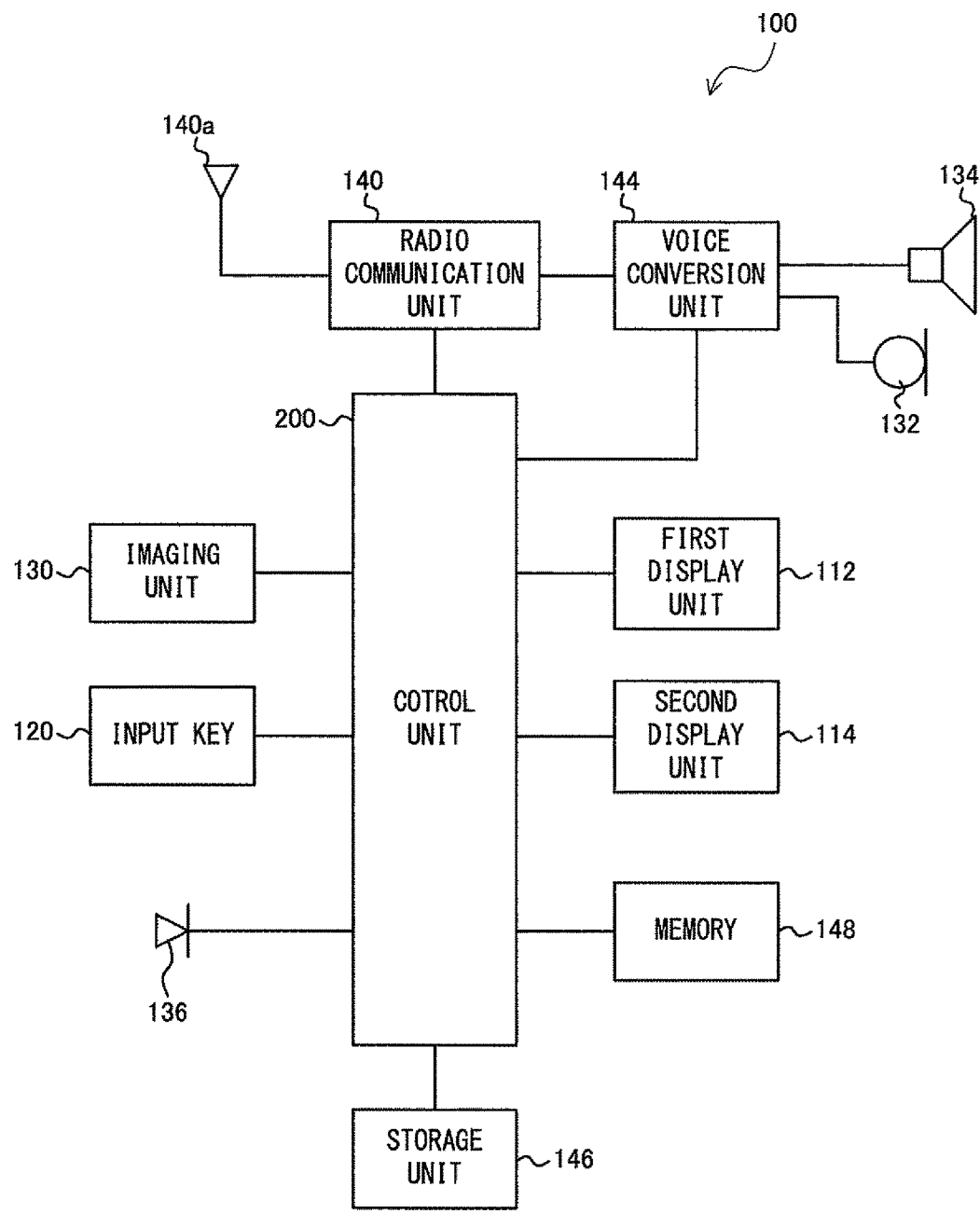
FIG. 3 is a diagram showing the mobile terminal apparatus according to the first exemplary embodiment.

Hereinafter, the first exemplary embodiment is explained with reference to the drawings. FIG. 2 is a plan view showing an appearance of a mobile terminal apparatus 100 according to the first exemplary embodiment. FIG. 3 is a diagram showing the mobile terminal apparatus 100 according to the first exemplary embodiment. Note that the same symbols are assigned to components which are practically the same.

The mobile terminal apparatus 100 is, for example, a mobile phone, a smart phone, a tablet PC (Personal Computer) or a portable game device. The mobile terminal apparatus 1 includes a first chassis 102 and a second chassis 104. A first display unit 112 is provided in the first chassis 102. A second display unit 114 is provided in the second chassis 104.

At least one of the first display unit 112 and the second display unit 114 is configured as a touchscreen in which a display device and an input device are combined. In other words, the mobile terminal apparatus 100 is configured so that users can operate it by touching the surface of the first display unit 112 or the second display unit 114 with an operation body such as a user's finger.

The mobile terminal apparatus 100 is configured so that the first chassis 102 and the second chassis 104 overlap each other so that the mobile terminal apparatus 100 can be easily carried around when it is not being used. For example, the mobile terminal apparatus 100 may be foldable along a hinge (not shown) installed between the first chassis 102 and the second chassis 104. Furthermore, for example, the mobile terminal apparatus 100 may be configured so that the first chassis 102 and the second chassis 104 are slidable across each other, and thereby, when the mobile terminal apparatus 100 is not used, the mobile terminal apparatus 100 may be configured so that the second chassis 104 can move under the first chassis 102 or the first chassis 102 can move under the second chassis 104.

Moreover, an input key 120 is provided at, for example, the side of the second chassis 104. The input key 120 is, for example, composed of a power supply button 120a, a volume increase button 120b and a volume decrease button 120c. The mobile terminal apparatus 100 can be powered on or off by pushing the power supply button 120a. Pushing the volume increase button 120b enables the volume related to the mobile terminal apparatus 100 to be increased. Pushing the volume decrease button 120c enables the volume related to the mobile terminal apparatus 100 to be decreased.

An after-mentioned display screen acquisition process is started by operating the input key 120 in a predetermined way. The display screen acquisition process means a process to generate the image data (screen data) which indicates the screen displayed on at least one of the first display unit 112 and the second display unit 114, such as the screen shot, the screen capturing, the screen dump or the print screen.

An imaging unit 130 is provided at the first chassis 102 or the second chassis 104. The imaging unit 130 is, for example, a camera. The imaging unit 130 shoots an image of a subject and generates image data indicating the shot image. A microphone 132 and a speaker 134 are provided at the first chassis 102 or the second chassis 104. An LED (Light Emitting Diode) 136 which lights up under the control of a control unit 200 mentioned later is provided at the first chassis 102 or the second chassis 104.

A radio communication unit 140, a voice conversion unit 144, a storage unit 146, a memory 148 and the control unit 200 are provided within the first chassis 102 or the second chassis 104. The radio communication unit 140 performs radio communication with another apparatus via an antenna 140a and sends and receives information. The voice conversion unit 144 converts voice data received by the radio communication unit 140 into a voice and causes the speaker 134 to output the voice. The voice conversion unit 144 converts voice data output from the control unit 200 into a voice and causes the speaker 134 to output the voice. The voice conversion unit 144 converts a voice acquired by the microphone 132 into voice data and outputs the voice data to the radio communication unit 140 or the control unit 200.

The storage unit 146 is, for example, a ROM (Read Only Memory) or RAM (Random Access Memory). The storage unit 146 stores application software which performs various types of functions under the control of the control unit 200. The memory 148 is, for example, a non-volatile memory. The memory 148 stores various types of data under the control of the control unit 200. The control unit 200 may include, for example, a Central Processing Unit (CPU), main storage or input/output port or the like. The control unit 200 performs various types of controls using various types of application software (program) stored in the storage unit 146. The control unit 200 controls the movement of the first display unit 112, the second display unit 114, the imaging unit 130, LED 136, the radio communication unit 140, the storage unit 146 and the memory 148, in response to the user's operation of the input key 120 or the input device provided at the first display unit 112 or the second display unit 114.

In particular, the control unit 200 executes the application software (hereinafter simply referred as "application") to generate various types of contents. The control unit 200 causes the first display unit 112 and/or the second display unit 114 to display the generated contents. Moreover, the control unit 200 can execute a plurality of applications at the same time. In this case, the control unit 200 can cause the first display unit 112 and the second display unit 114 to display a plurality of the generated contents respectively. The control unit 200 can perform the display screen acquisition process to acquire the screen data indicating the screens which include the contents displayed at the first display unit 112 and the second display unit 114. Detailed explanations are given hereinafter.

Figure 4:
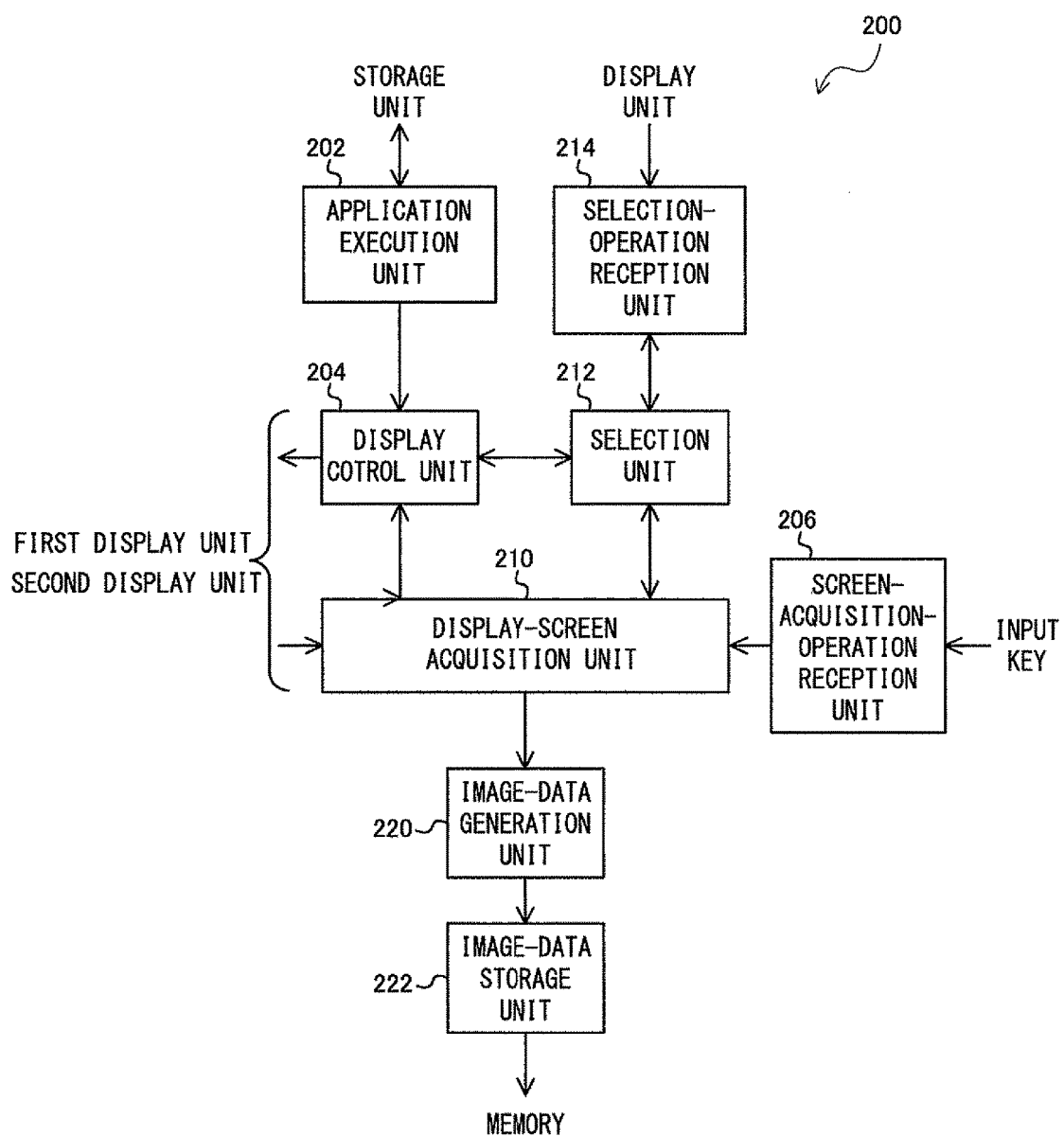
FIG. 4 is a diagram showing each component implemented by a control unit according to the first exemplary embodiment.
Figure 5:
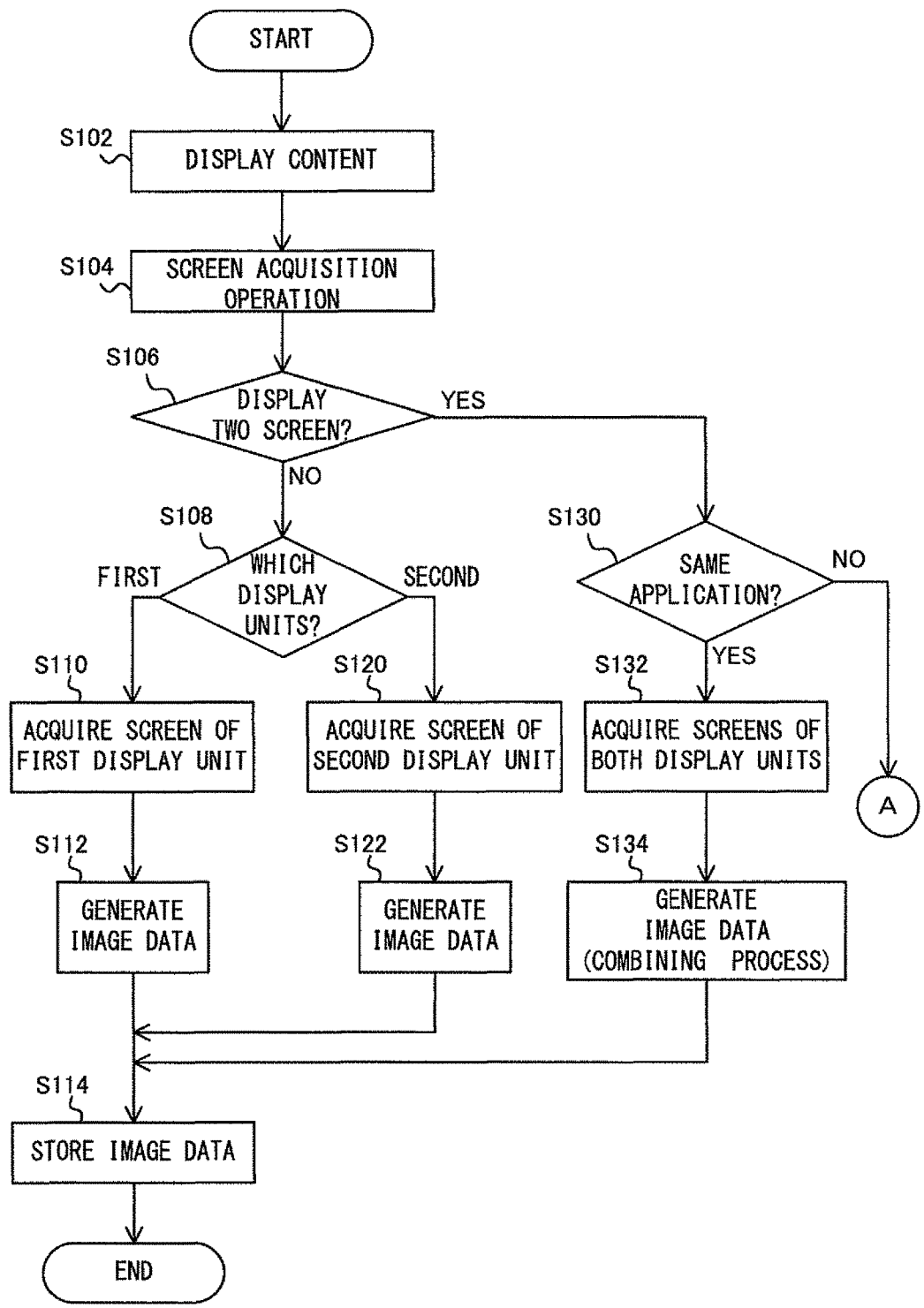
FIG. 5 is a flowchart showing processes performed by the control unit according to the first exemplary embodiment.
Figure 6:
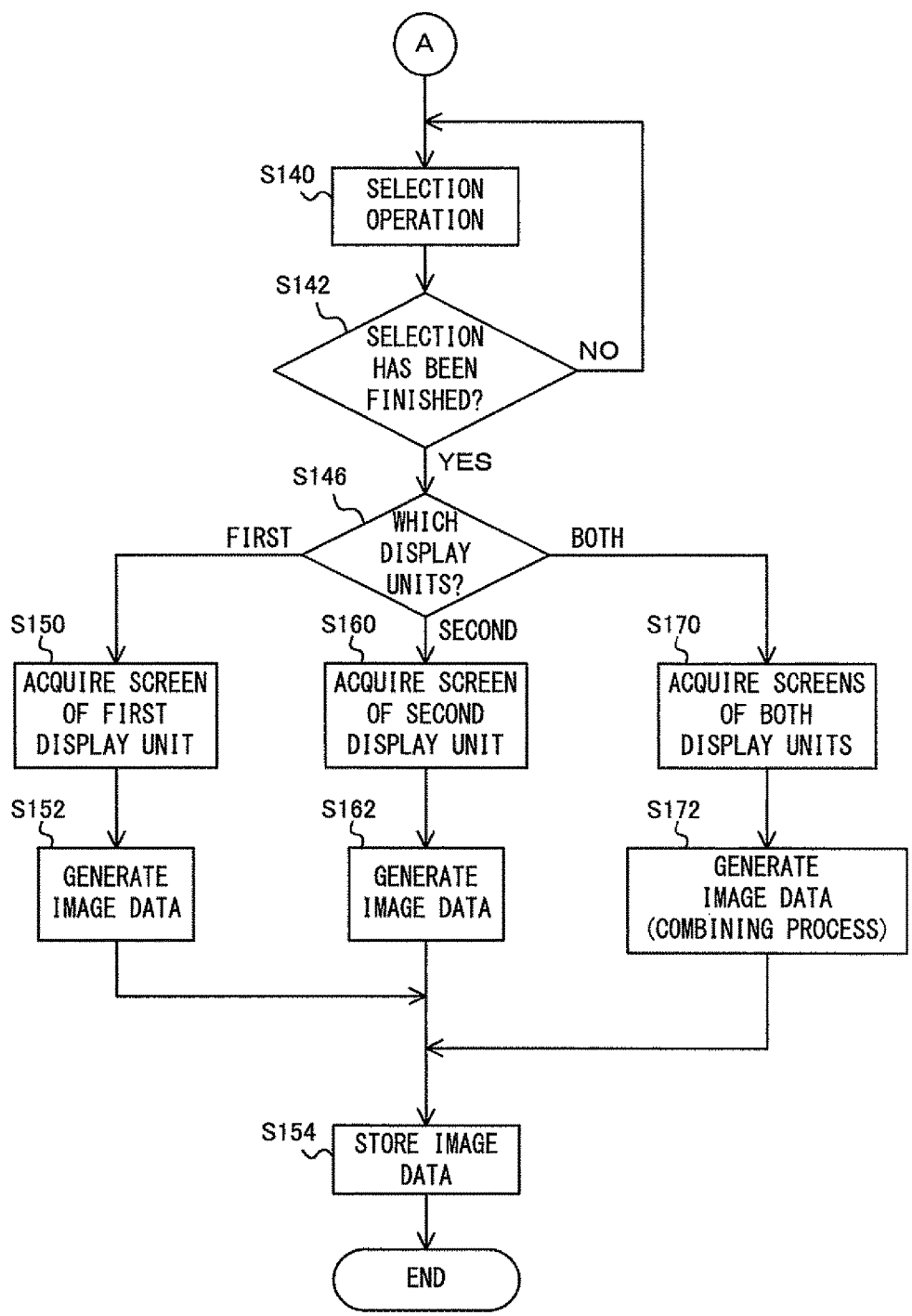
FIG. 6 is a flowchart showing processes performed by the control unit according to the first exemplary embodiment.

FIG. 4 is a diagram showing each component implemented by the control unit 200 according to the first exemplary embodiment shown in FIG. 3. FIGS. 5 and 6 are flowcharts showing processes performed by the control unit 200 according to the first exemplary embodiment. FIGS. 7A to 13 are diagrams used for explanations of the processes performed by the control unit 200 according to the first exemplary embodiment.

As shown in FIG. 4, the control unit 200 includes an application execution unit 202, a display control unit 204, a screen-acquisition-operation reception unit 206, a display-screen acquisition unit 210, a selection unit 212, a selection-operation reception unit 214, an image-data generation unit 220 and an image-data storage unit 222.

Furthermore, each component implemented by the control unit 200 can be, for example, implemented by executing a program under the control of a computing device (not shown) installed at the control unit 200 that is a computer. More specifically, the control unit 200 loads the program stored in the storage unit 146 into the main storage (not shown) and executes the program under the control of the computing device, thereby implementing each component. Alternatively, each component may be implemented by a combination of any of hardware, firmware and software, instead of such implementation being limited to being done by only software by the program.

The control unit 200 executes the application to cause at least one of the first display unit 112 and the second display unit 114 to display the contents (S102). Specifically, the application execution unit 202 acquires the application data from the storage unit 146 to execute the application. The application execution unit 202 generates the contents corresponding to the application by executing the application. The application execution unit 202 outputs the generated contents to the display control unit 204. The display control unit 204 performs necessary processes such as a conversion process for the contents generated by the application execution unit 202. The display control unit 204 performs control so that at least one of the first display unit 112 and the second display unit 114 displays the contents.

Figure 7A:
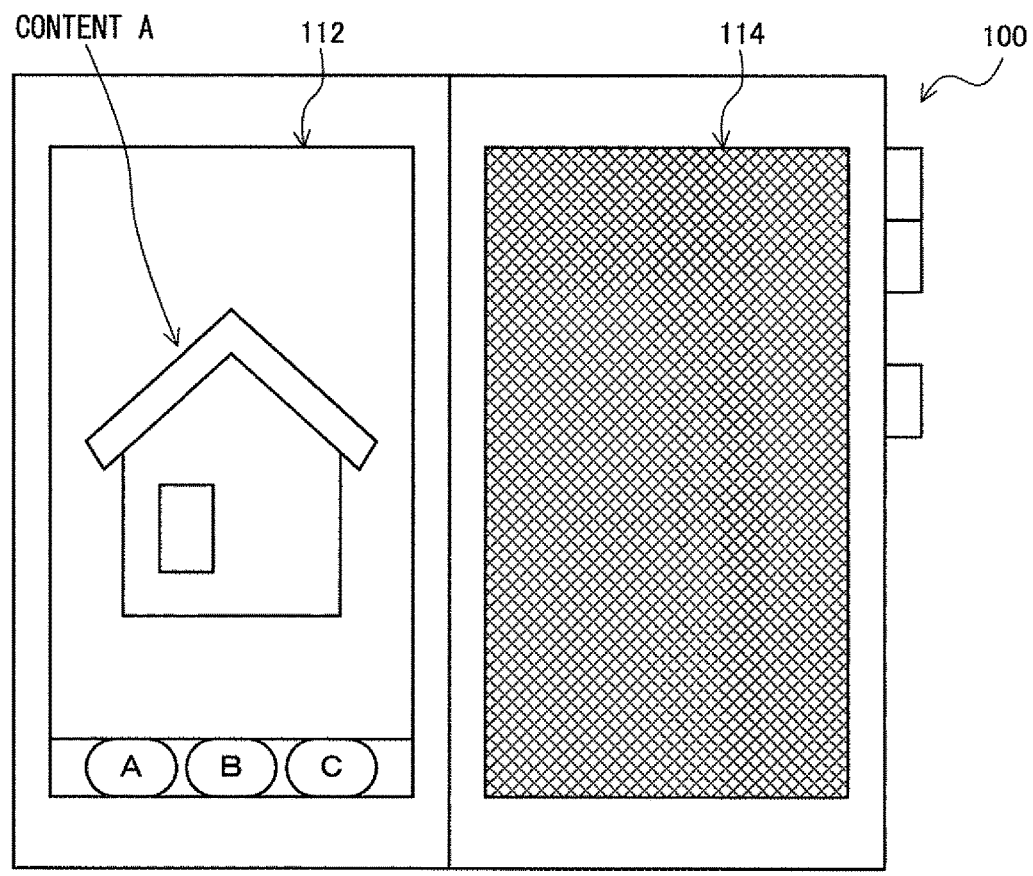
FIG. 7A is a diagram used for explanations of the processes performed by the control unit according to the first exemplary embodiment.
Figure 7B:
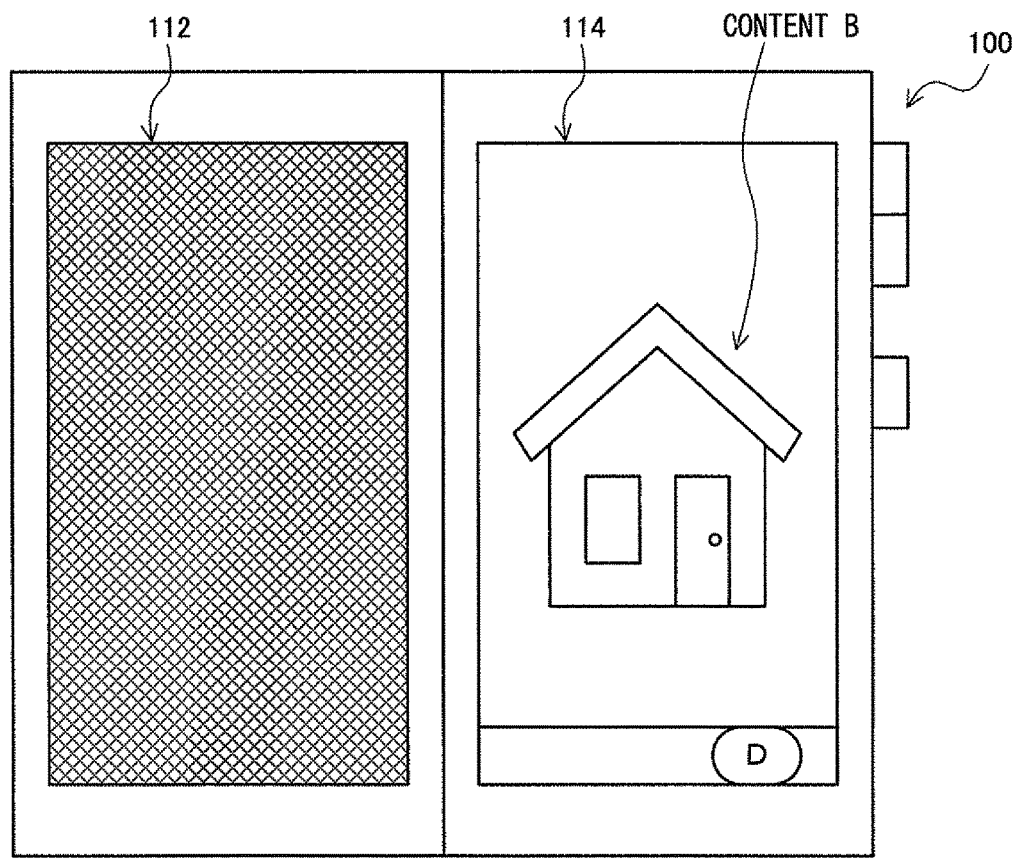
FIG. 7B is a diagram used for explanations of the processes performed by the control unit according to the first exemplary embodiment.

For example, when the application execution unit 202 executes application A to generate content A, the display control unit 204 may cause the first display unit 112 to display the content A as shown in FIG. 7A as an example. Note that, in this case, the display control unit 204 may control the second display unit 114, on which no content is displayed, so as to turn off its display. This enables power consumption to be reduced. For example, when the application execution unit 202 executes application B to generate content B, the display control unit 204 may cause the second display unit 114 to display the content B as shown in FIG. 7B as an example. Note that, in this case, the display control unit 204 may control the first display unit 112, on which no content is displayed, so as to turn off its display.

Figure 8:
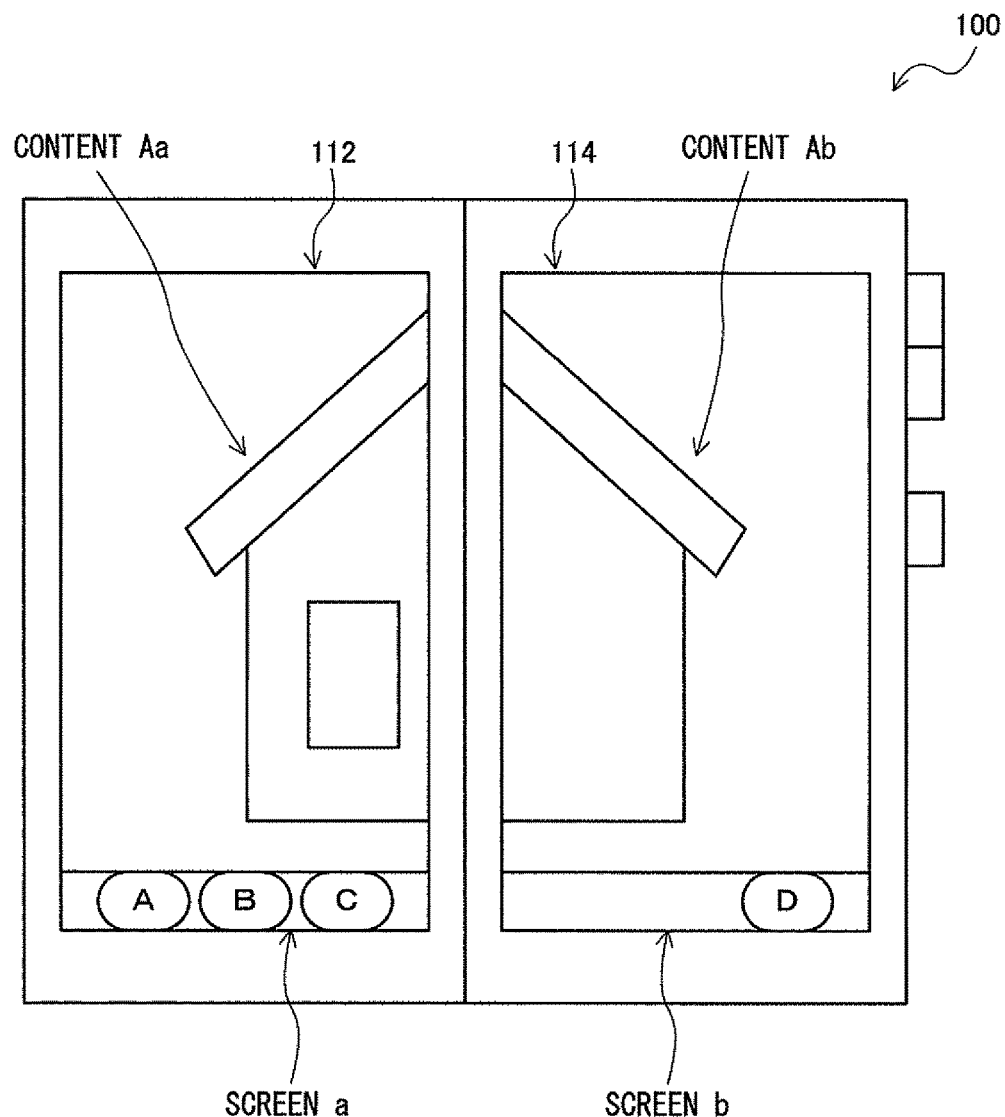
FIG. 8 is a diagram used for explanations of the processes performed by the control unit according to the first exemplary embodiment.

For example, when the application execution unit 202 executes application A to generate content A, the display control unit 204 may cause both the first display unit 112 and the second display unit 114 to display the content A as shown in FIG. 8 as an example. In this case, the display control unit 204 may generate content Aa indicating a right side of the content A and generate content Ab indicating a left side of the content A. Moreover, the display control unit 204 may cause the first display unit 112 to display the content Aa and cause the second display unit 114 to display the content Ab.

Furthermore, the application execution unit 202 may execute the application A and the application B at the same time. In this case, the application execution unit 202 may generate the content A by execution of the application A and generate the content B by execution of the application B. In this case, the display control unit 204 may cause the first display unit 112 to display the content A and cause the second display unit 114 to display the content B.

Next, the control unit 200 receives a display screen acquisition operation for starting the display screen acquisition process (S104). Specifically, when a user performs a predetermined operation of the input key 120, the screen-acquisition-operation reception unit 206 receives a signal indicating the screen acquisition operation and outputs the signal to the display-screen acquisition unit 210. In this way, the display-screen acquisition unit 210 starts the display screen acquisition process. For example, when the user pushes the power supply button 120a and the volume decrease button 120c, the screen-acquisition-operation reception unit 206 may receive the signal indicating the screen acquisition operation.

Next, the control unit 200 determines whether the contents are displayed on both the first display unit 112 and the second display unit 114 or not (S106). Specifically, the display-screen acquisition unit 210 determines whether the display control unit 204 causes both the first display unit 112 and the second display unit 114 to display the contents or not.

When the content is displayed on only one of the first display unit 112 and the second display unit 114 (NO at S106), the control unit 200 determines whether the contents are displayed on the first display unit 112 or the second display unit 114 (S108). Specifically, when the display control unit 204 causes the first display unit 112 to display the content, for example, as shown FIG. 7A, the selection unit 212 selects "first display unit 112". On the other hand, when the display control unit 204 causes the second display unit 114 to display the content, for example, as shown FIG. 7B, the selection unit 212 selects "second display unit 114". The display-screen acquisition unit 210 determines whether the selection unit 212 selects the first display unit 112 or the second display unit 114.

When it is determined that the content is displayed on the first display unit 112 ("FIRST" at S108), the control unit 200 acquires the screen data indicating the screen displayed on the first display unit 112 (S110). Specifically, the display-screen acquisition unit 210 acquires the screen data which indicates the screen displayed on the first display unit 112. As examples of ways for acquiring the screen data, a signal which is transmitted from the control unit 200 to the first display unit 112 may be acquired and the screen data may be generated from the signal, or the imaging unit 130 may shoot an image of the screen displayed on the first display unit 112.

Figure 10A:
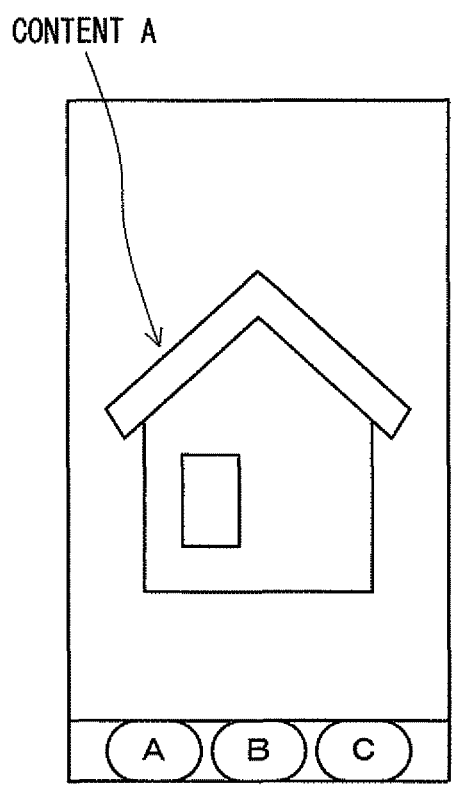
FIG. 10A is a diagram used for explanations of the processes performed by the control unit according to the first exemplary embodiment.

Next, the control unit 200 generates the image data corresponding to the screen displayed on the first display unit 112 (S112). Specifically, the image-data generation unit 220 performs necessary processes, such as conversion of a data format, for the screen data acquired by the display-screen acquisition unit 210, and thereby generates the image data. For example, when the screen which includes the content A is displayed on the first display unit 112, as shown in FIG. 7A as an example, the image-data generation unit 220 generates the image data which indicates the image of the screen including the content A, as shown in FIG. 10A as an example. Next, the image-data storage unit 222 of the control unit 200 stores the image data, which is generated by the image-data generation unit 220, in the memory 148 (S114).

When it is determined that the content is displayed on the second display unit 114 ("SECOND" at S108), the control unit 200 acquires the screen data indicating the screen displayed on the second display unit 114 (S120). Specifically, the display-screen acquisition unit 210 acquires the screen data which indicates the screen displayed on the second display unit 114 in a way similar to the process of S110.

Figure 10B:
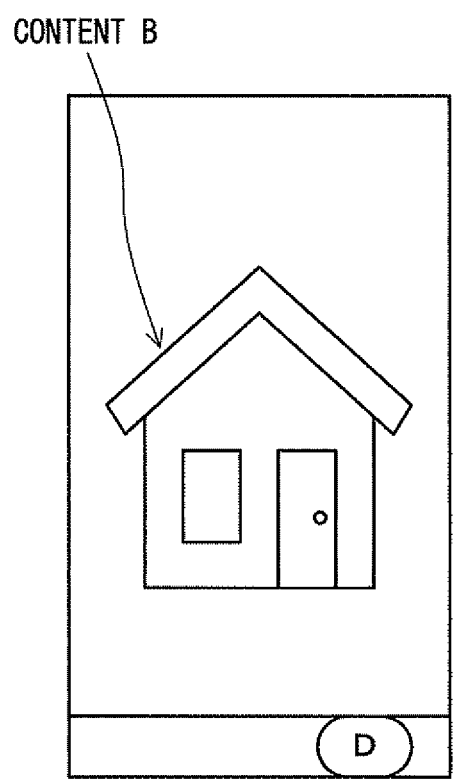
FIG. 10B is a diagram used for explanations of the processes performed by the control unit according to the first exemplary embodiment.

Next, the control unit 200 generates the image data corresponding to the screen displayed on the second display unit 114 (S122). Specifically, the image-data generation unit 220 performs necessary processes, such as conversion of data format, for the screen data acquired by the display-screen acquisition unit 210, and thereby generates the image data. For example, when the screen which includes the content B is displayed on the second display unit 114, as shown in FIG. 7B as an example, the image-data generation unit 220 generates the image data which indicates the image of the screen including the content B, as shown in FIG. 10B as an example. Next, the image-data storage unit 222 of the control unit 200 stores the image data, which is generated by the image-data generation unit 220, in the memory 148 (S114).

In this way, when the content is displayed on only one of the two display units, it is possible to generate the image data which relates to the screen displayed on the display unit on which the content is displayed. In this case, the image data which relates to the screen displayed on the display unit can be generated after the user performs the display screen acquisition operation without performing any operation.

On the other hand, when the contents are displayed on both the first display unit 112 and the second display unit 114 (YES at S106), the control unit 200 determines whether the contents are displayed on both the first display unit 112 and the second display unit 114 by the same application (S130). Specifically, for example, as shown in FIG. 8 as an example, when the display control unit 204 causes both the first display unit 112 and the second display unit 114 to display the contents by one application (application A in the example of FIG. 8), the selection unit 212 selects both the "first display unit 112" and the "second display unit 114". In other words, when the contents are displayed on both the first display unit 112 and the second display unit 114 by same application, the selection unit 212 automatically selects both of the "first display unit 112" and the "second display unit 114".

Figure 9:
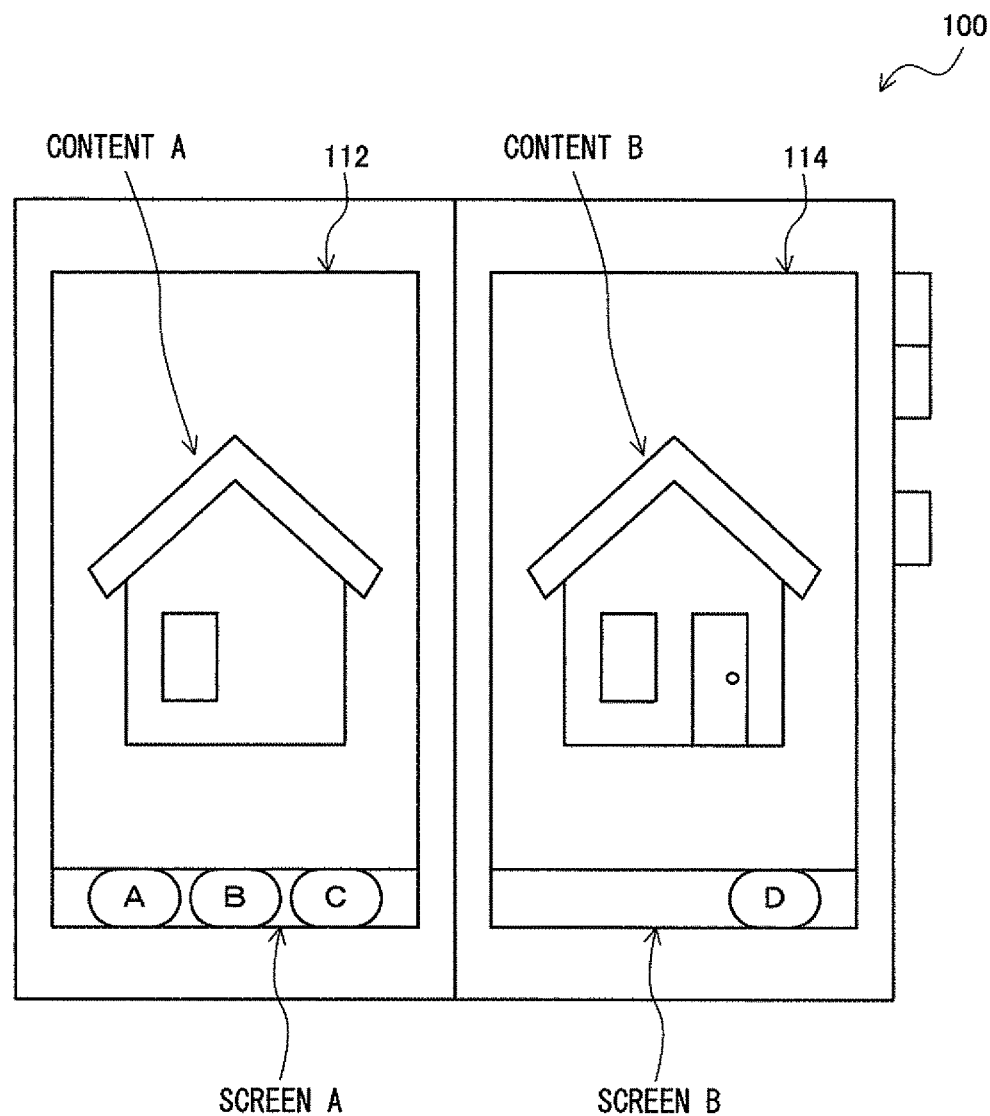
FIG. 9 is a diagram used for explanations of the processes performed by the control unit according to the first exemplary embodiment.

On the other hand, for example, as shown in FIG. 9 as an example, when the display control unit 204 causes both the first display unit 112 and the second display unit 114 to display the contents by a plurality of applications (application A and application B at the example of FIG. 9), the selection unit 212 has not performed selection of the display unit. In this case, after a selection operation is performed, the selection unit 212 selects at least one of the "first display unit 112" and the "second display unit 114" in accordance with the selection operation, as mentioned below.

The display-screen acquisition unit 210 determines whether the selection unit 212 selects the first display unit 112 or the second display unit 114. When the contents are displayed on both the first display unit 112 and the second display unit 114 by the same application (that is, the selection unit 212 selects both the "first display unit 112" and the "second display unit 114") (YES at S130), the control unit 200 acquires two screen data indicating screens which are respectively displayed on both the first display unit 112 and the second display unit 114 (S132).

Specifically, the display-screen acquisition unit 210 acquires the screen data which indicates the screen displayed on the first display unit 112 by a way similar to the process of S110. In the same manner, the display-screen acquisition unit 210 acquires the screen data which indicates the screen displayed on the second display unit 114. For example, in the example of FIG. 8, the display-screen acquisition unit 210 acquires a screen data a indicating a screen a, which includes content Aa, displayed on the first display unit 112. In the same manner, the display-screen acquisition unit 210 acquires a screen data b indicating a screen b, which includes content Ab, displayed on the second display unit 114.

Next, the control unit 200 generates the image data corresponding to the screens displayed on the first display unit 112 and the second display unit 114 (S134). Specifically, the image-data generation unit 220 combines two screen data acquired by the display-screen acquisition unit 210. The image-data generation unit 220 performs the necessary processes such as the conversion of data format for the screen data where the screen data are combined to become one data, and thereby generates the image data.

Figure 11:
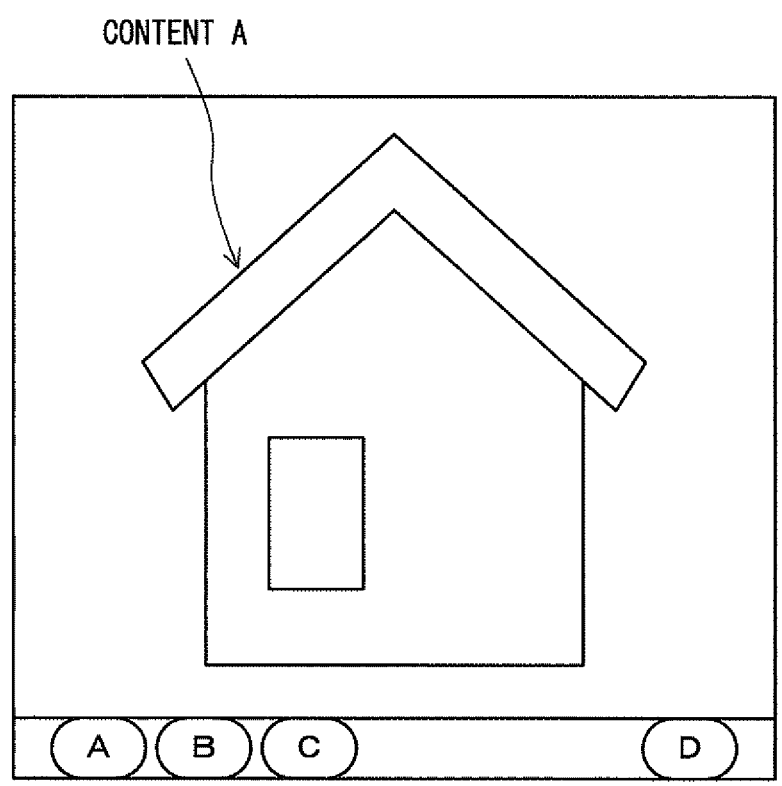
FIG. 11 is a diagram used for explanations of the processes performed by the control unit according to the first exemplary embodiment.

For example, when, as shown in FIG. 8 as an example, the screen a which includes the content Aa is displayed on the first display unit 112 and the screen b which includes the content Ab is displayed on the second display unit 114, the image-data generation unit 220 generates an image data indicating an image into which the screen a and the screen b are combined as shown in FIG. 11 as an example. That is, as shown in FIG. 8 as an example, the content A has been displayed separately on two display units by the application A which is one application. On the other hand, as shown in FIG. 11 as an example, the image data which is generated by the display screen acquisition process is in a state in which the image data are combined into one instead of the image data remaining separated.

Next, the image-data storage unit 222 of the control unit 200 stores the image data, which is generated by the image-data generation unit 220, in the memory 148 (S114).

On the other hand, when the contents are displayed on both the first display unit 112 and the second display unit 114 by different applications (that is, the selection unit 212 has not performed the selection of the display unit.) (NO at S130), the control unit 200 migrates to a display-unit selection operation mode (S140).

Specifically, the selection unit 212 controls the selection-operation reception unit 214 to put it into a state of receiving an operation for selecting the display units (the display-unit selection operation mode). When a user performs a predetermined operation in this display-unit selection operation mode, the user can select (i.e., determine) that the screen displayed in which of the display units should be acquired (i.e., the user can select the display unit which displays the screen to be acquired). For example, when the first display unit 112 is configured as the touch screen, the user can perform the selection operation (first operation) by tapping the surface of the first display unit 112. Note that the "tap" is an operation in which the user touches a finger to the surface of the display unit and separates the finger from the surface within a predetermined time (for example within one second).

Figure 12A:
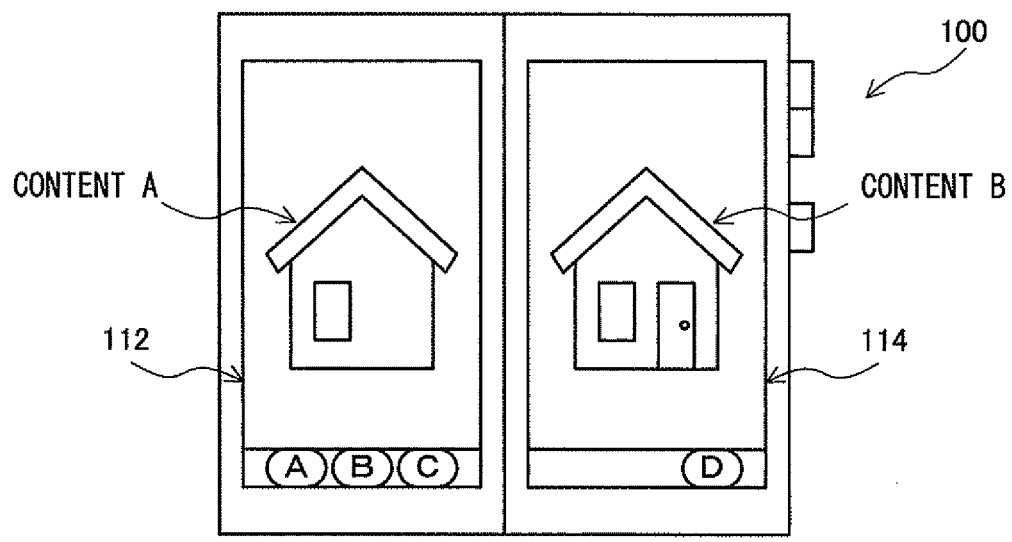
FIG. 12A is a diagram used for explanations of the processes performed by the control unit according to the first exemplary embodiment.
Figure 12B:
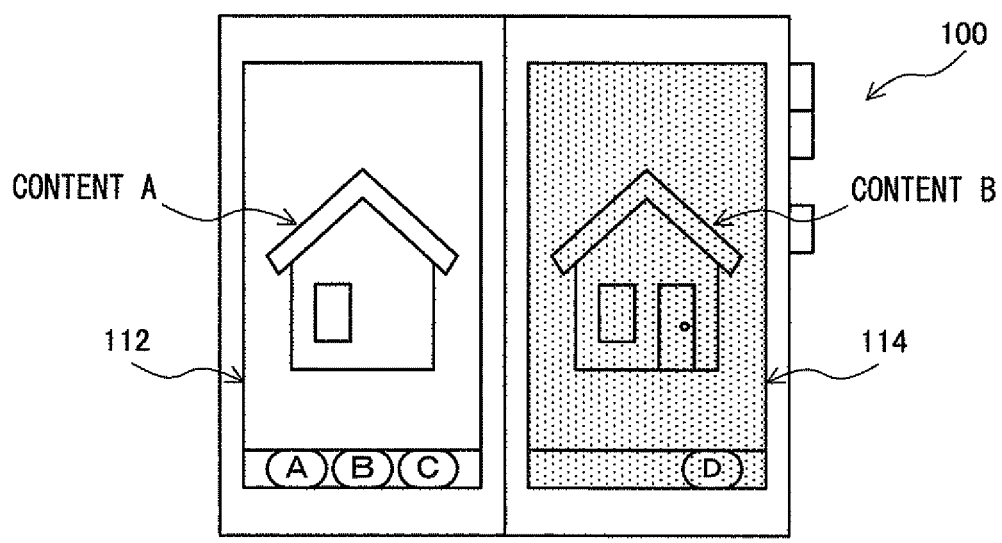
FIG. 12B is a diagram used for explanations of the processes performed by the control unit according to the first exemplary embodiment.

Firstly, in the state where both the first display unit 112 and the second display unit 114 light up brightly as shown in FIG. 12A as an example, when the user taps the first display unit 112 and the selection-operation reception unit 214 receives the tap operation, the display control unit 204 controls the brightness of the display of the second display unit 114 to be darker than that of the first display unit 112 as shown in FIG. 12B as an example. When a tap operation is not performed for a predetermined time (for example, for five seconds) in this state, the selection unit 212 selects the "first display unit 112".

Figure 12C:
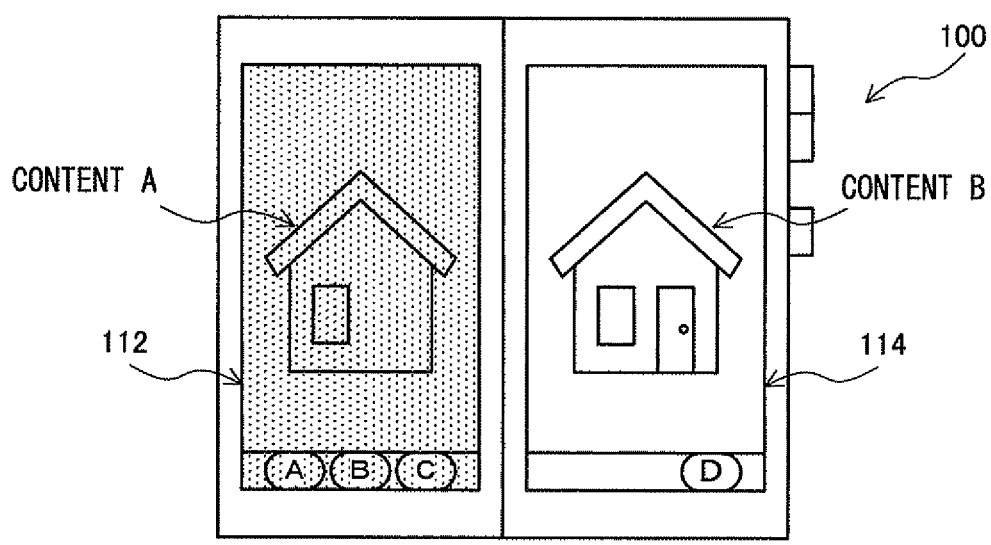
FIG. 12C is a diagram used for explanations of the processes performed by the control unit according to the first exemplary embodiment.

On the other hand, when the user taps the first display unit 112 again within the predetermined time and the selection-operation reception unit 214 receives the tap operation, the display control unit 204 controls the brightness of the display of the first display unit 112 to be darker than that of the second display unit 114 and controls the brightness of the display of the second display unit 114 to be brighter than that of the first display unit 112, as shown in FIG. 12C as an example. When a tap operation is not performed for a predetermined time (for example, for five seconds) in this state, the selection unit 212 selects the "second display unit 114".

On the other hand, when the user taps the first display unit 112 again within the predetermined time and the selection-operation reception unit 214 receives the tap operation, the display control unit 204 performs control so that both the first display unit 112 and the second display unit 114 are equally illuminated as shown in FIG. 12A as an example. When a tap operation is not performed for a predetermined time (for example for five seconds) in this state, the selection unit 212 selects the "first display unit 112 and second display unit 114".

In this way, because the displays of the first display unit 112 and the second display unit 114 change each time the user performs the selection operation (e.g. tap operation), the user can easily understand which display unit will be selected if the user does not perform the selection operation for the predetermined time in this state (in other words, which display unit is a candidate to be selected (selection candidate)). Moreover, the user can perform the above-described switching of the selection candidate with an easy operation such as the tap operation.

Next, the control unit 200 determines whether the selection operation of the display unit has been finished or not (S142). Specifically, as mentioned above, the selection unit 212 determines whether no selection operation has been performed for the predetermined time or not. When it is determined that the selection operation of the display unit has not been finished (that is, when the selection operation has been performed within the predetermined time) (NO at S142), the control unit 200 repeats the process of S140.

On the other hand, when it is determined that the selection operation of the display unit has been finished (that is, when the selection operation has not been performed within the predetermined time) (YES at S142), the control unit 200 determines which display unit of the first display unit 112 and the second display unit 114 has been selected (S146). Specifically, the display-screen acquisition unit 210 determines whether the selection unit 212 has selected the "first display unit 112", "second display unit 114" or the "first display unit 112 and second display unit 114".

When it is determined that the "first display unit 112" has been selected ("FIRST" at S146), the control unit 200 acquires the screen data indicating the screen displayed on the first display unit 112 (S150). Specifically, the display-screen acquisition unit 210 acquires the screen data which indicates the screen displayed on the first display unit 112 in a way similar to the process of S110. Next, the control unit 200 generates the image data corresponding to the screen displayed on the first display unit 112 (S152). Specifically, the image-data generation unit 220 performs necessary processes, such as conversion of data format, for the screen data acquired by the display-screen acquisition unit 210, and thereby generates the image data.

For example, in a case where the screen which includes the content A is displayed on the first display unit 112 and the screen which includes the content B is displayed on the second display unit 114, as shown in FIG. 9 as an example, when the first display unit 112 has been selected as shown in FIG. 12B as an example, the image-data generation unit 220 generates the image data which indicates the image of the screen including the content A, as shown in FIG. 10A as an example.

Next, the image-data storage unit 222 of the control unit 200 stores the image data, which is generated by the image-data generation unit 220, in the memory 148 (S154).

On the other hand, when it is determined that the "second display unit 114" has been selected ("SECOND" at S146), the control unit 200 acquires the screen data indicating the screen displayed on the second display unit 114 (S160). Specifically, the display-screen acquisition unit 210 acquires the screen data which indicates the screen displayed on the second display unit 114 in a way similar to the process of S120. Next, the control unit 200 generates the image data corresponding to the screen displayed on the second display unit 114 (S162). Specifically, the image-data generation unit 220 performs necessary processes, such as conversion of data format, for the screen data acquired by the display-screen acquisition unit 210, and thereby generates the image data.

For example, when the screen which includes the content A is displayed on the first display unit 112 and the screen which includes the content B is displayed on the second display unit 114, as shown in FIG. 9 as an example, and the second display unit 114 has been selected as shown in FIG. 12C as an example, then the image-data generation unit 220 generates the image data which indicates the image of the screen including the content B, as shown in FIG. 10B as an example.

Next, the image-data storage unit 222 of the control unit 200 stores the image data, which is generated by the image-data generation unit 220, in the memory 148 (S154).

On the other hand, when it is determined that the "first display unit 112 and second display unit 114" have been selected ("BOTH" at S146), the control unit 200 acquires two screen data indicating the screens which are respectively displayed on both the first display unit 112 and the second display unit 114 (S170). Specifically, in a way similar to the process of S132, the display-screen acquisition unit 210 acquires the screen data which indicates the screen displayed on the first display unit 112. In a similar way, the display-screen acquisition unit 210 acquires the screen data which indicates the screen displayed on the second display unit 114.

Next, the control unit 200 generates the image data corresponding to the screens displayed on the first display unit 112 and the second display unit 114 (S172). Specifically, the image-data generation unit 220 combines two screen data acquired by the display-screen acquisition unit 210. The image-data generation unit 220 performs the necessary processes such as the conversion of data format for the screen data where the screen data are combined to become one data, and thereby generates the image data.

Figure 13:
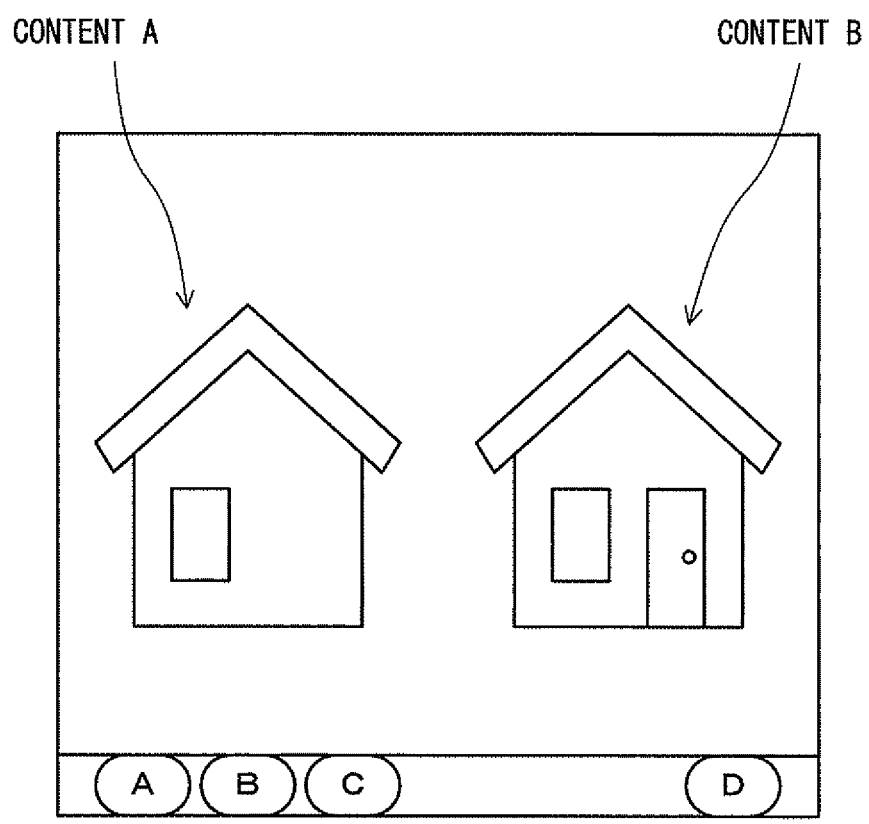
FIG. 13 is a diagram used for explanations of the processes performed by the control unit according to the first exemplary embodiment.

For example, in a case where, as shown in FIG. 9 as an example, the screen A which includes the content A is displayed on the first display unit 112 and the screen B which includes the content B is displayed on the second display unit 114, when both the first display unit 112 and the second display unit 114 have been selected, the image-data generation unit 220 generates an image data indicating an image into which the screen A and the screen B are combined as shown in FIG. 13 as an example.

Next, the image-data storage unit 222 of the control unit 200 stores the image data, which is generated by the image-data generation unit 220, in the memory 148 (S154).

In this way, the user can repeat the selection operation (e.g. tap operation) to select the desired screen depending on the number of times the selection operation is performed. In the example of FIGS. 12A to 12C, for example, it is assumed that the display units are initially in the state of FIG. 12A. When the user performs the selection operation once in this state, the state of the display units becomes the state of FIG. 12B. Accordingly, the selection unit 212 selects the first display unit 112. That is, the display-screen acquisition unit 210 can acquire the display screen of the first display unit 112. When the user performs the selection operation twice, the state of the display units becomes the state of FIG. 12C. Accordingly, the selection unit 212 selects the second display unit 114. That is, the display-screen acquisition unit 210 can acquire the display screen of the second display unit 114.

When the user performs the selection operation three times, the state of the display units becomes the state of FIG. 12A. Accordingly, the selection unit 212 selects the first display unit 112 and the second display unit 114. That is, the display-screen acquisition unit 210 can acquire the display screen of the first display unit 112 and the display screen of the second display unit 114. The image-data generation unit 220 then can generate the image data by combining the display screen of the first display unit 112 and the display screen of the second display unit 114.

Therefore, special operations and input key devices for the selection operation are unnecessary. Furthermore, when the selection operation has not been performed for the predetermined time, the display unit is automatically selected. Thus, the user can easily acquire the image data relating to a desired screen by only repeating one operation such as the tap operation.

Second Exemplary Embodiment

Next, a second exemplary embodiment is explained. In the second exemplary embodiment, the processes where the contents are displayed on both the first display unit 112 and the second display unit 114 by the same application in the first exemplary embodiment are modified. Hereinafter, processes where the processes after "YES of S106" at FIG. 5 have been modified are explained.

Figure 14:
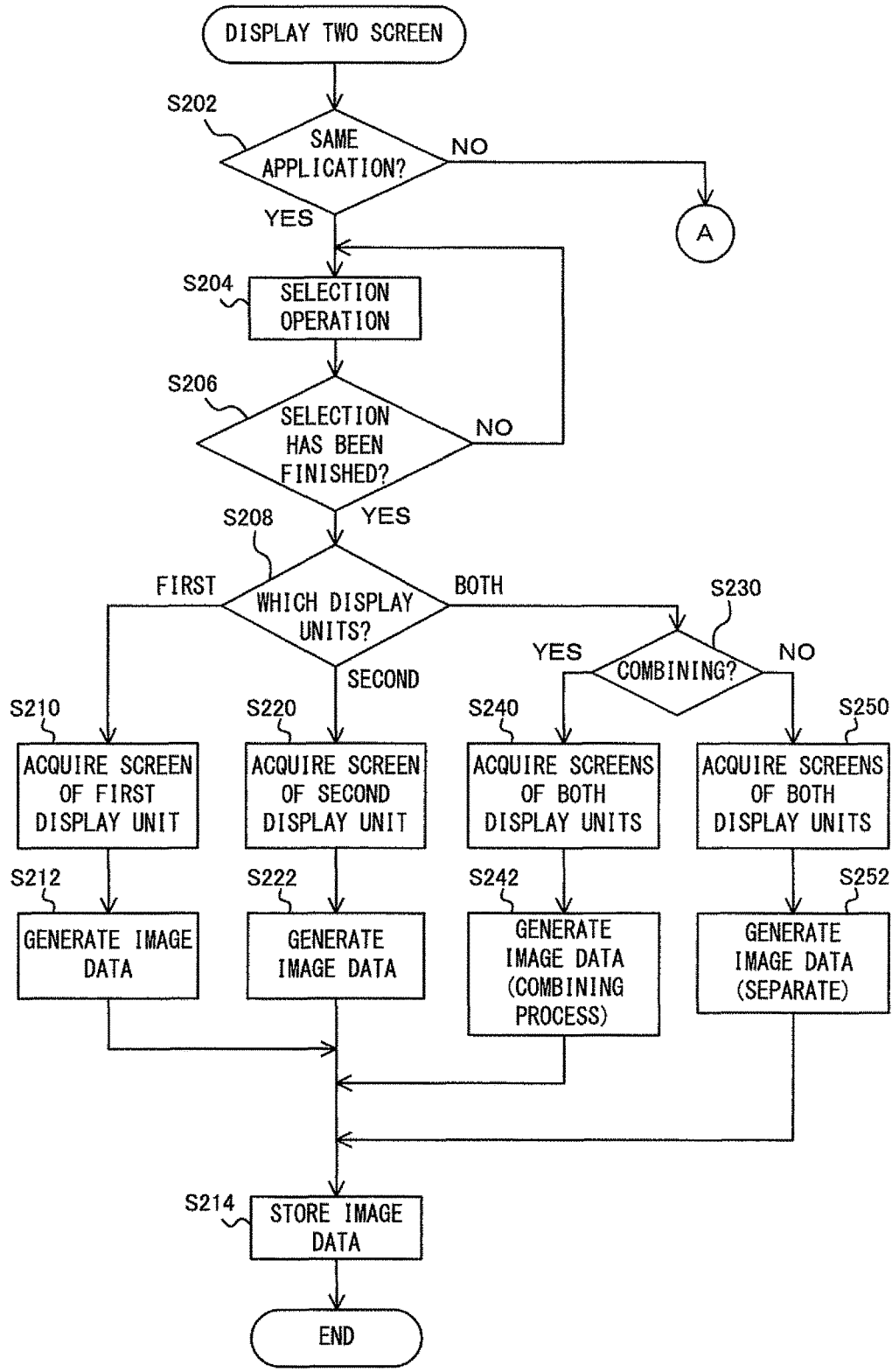
FIG. 14 is a flowchart showing processes performed by a control unit according to a second exemplary embodiment.

FIG. 14 is a flowchart showing processes performed by the control unit 200 according to the second exemplary embodiment. The flowchart at FIG. 14 is a replacement for S130 to S134 at FIG. 5. FIGS. 15A to 17B are diagrams used for explanations of the processes according to the second exemplary embodiment.

When the contents are displayed on both the first display unit 112 and the second display unit 114, the control unit 200 determines whether the contents are displayed on both the first display unit 112 and the second display unit 114 by the same application (S202). Specifically, the display-screen acquisition unit 210 determines whether the display control unit 204 causes both the first display unit 112 and the second display unit 114 to display the contents by one application (application A at the example of FIG. 8).

When the contents are displayed on both the first display unit 112 and the second display unit 114 by different applications (YES at S202), the process of S140 shown at FIG. 6 is performed and then processes similar to those of the first exemplary embodiment are performed. On the other hand, when the contents are displayed on both the first display unit 112 and the second display unit 114 by the same application (YES at S202), the control unit 200 migrates to a display-unit selection operation mode (S204).

Specifically, the selection unit 212 controls the selection-operation reception unit 214 to put it into a state of receiving an operation for selecting the display units (the display-unit selection operation mode). When a user performs a predetermined operation in this display-unit selection operation mode, the user can select (i.e., determine) that the screen displayed in which of the display units should be acquired (i.e., the user can select the display unit which displays the screen to be acquired). Moreover, in the case of acquiring the screens displayed on both the first display unit 112 and the second display unit 114, it is possible to select whether to generate an image data into which their screens are combined or to generate separate image data without combining the screens. For example, when the first display unit 112 is configured as a touch screen similarly to the first exemplary embodiment, the user can perform the selection operation by tapping the surface of the first display unit 112.

Figure 15A:
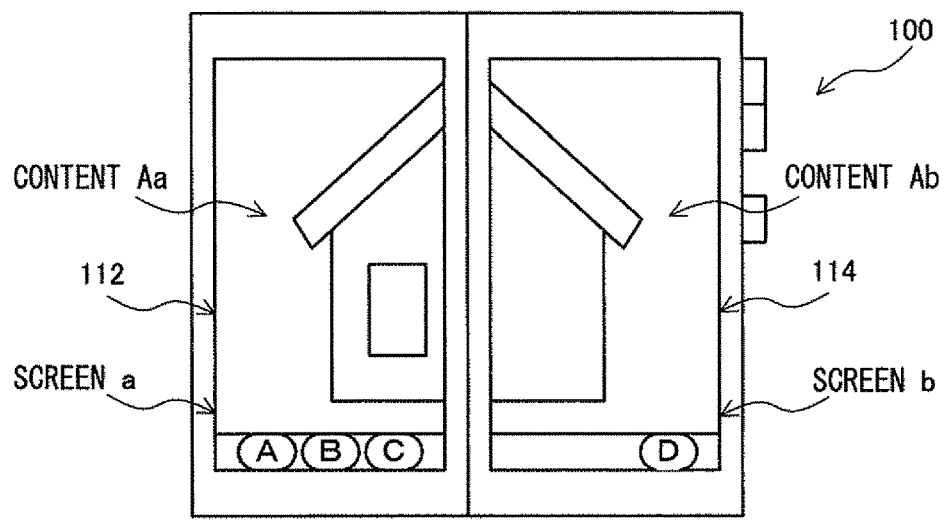
FIG. 15A is a diagram used for explanations of the processes according to the second exemplary embodiment.
Figure 15B:
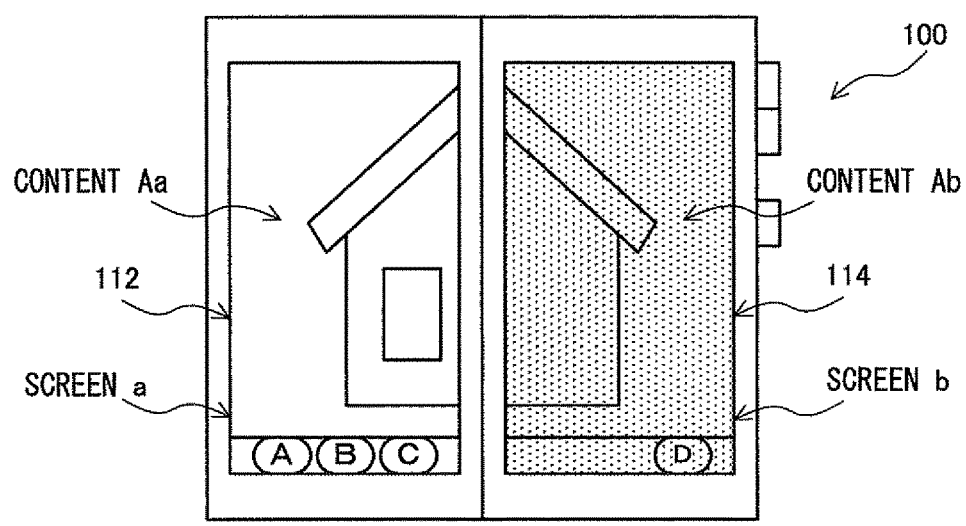
FIG. 15B is a diagram used for explanations of the processes according to the second exemplary embodiment.

Firstly, in the state where both the first display unit 112 and the second display unit 114 light up brightly as shown in FIG. 15A as an example, when the user taps the first display unit 112 and the selection-operation reception unit 214 receives the tap operation, the display control unit 204 controls the brightness of the display of the second display unit 114 to be darker than that of the first display unit 112 as shown in FIG. 15B as an example. When a tap operation is not performed for a predetermined time (for example, for five seconds) in this state, the selection unit 212 selects the "first display unit 112".

Figure 15C:
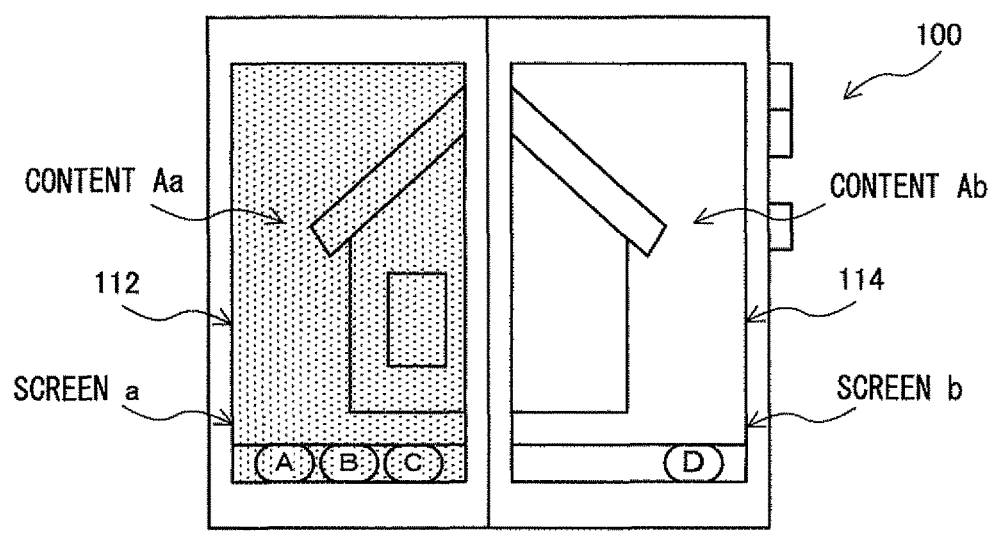
FIG. 15C is a diagram used for explanations of the processes according to the second exemplary embodiment.

On the other hand, when the user taps the first display unit 112 again within the predetermined time and the selection-operation reception unit 214 receives the tap operation, the display control unit 204 controls the brightness of the display of the first display unit 112 to be darker than that of the second display unit 114 and controls the brightness of the display of the second display unit 114 to be brighter than that of the first display unit 112, as shown in FIG. 15C as an example. When a tap operation (the selection operation) is not performed for a predetermined time (for example for five seconds) in this state, the selection unit 212 selects the "second display unit 114".

Figure 16:
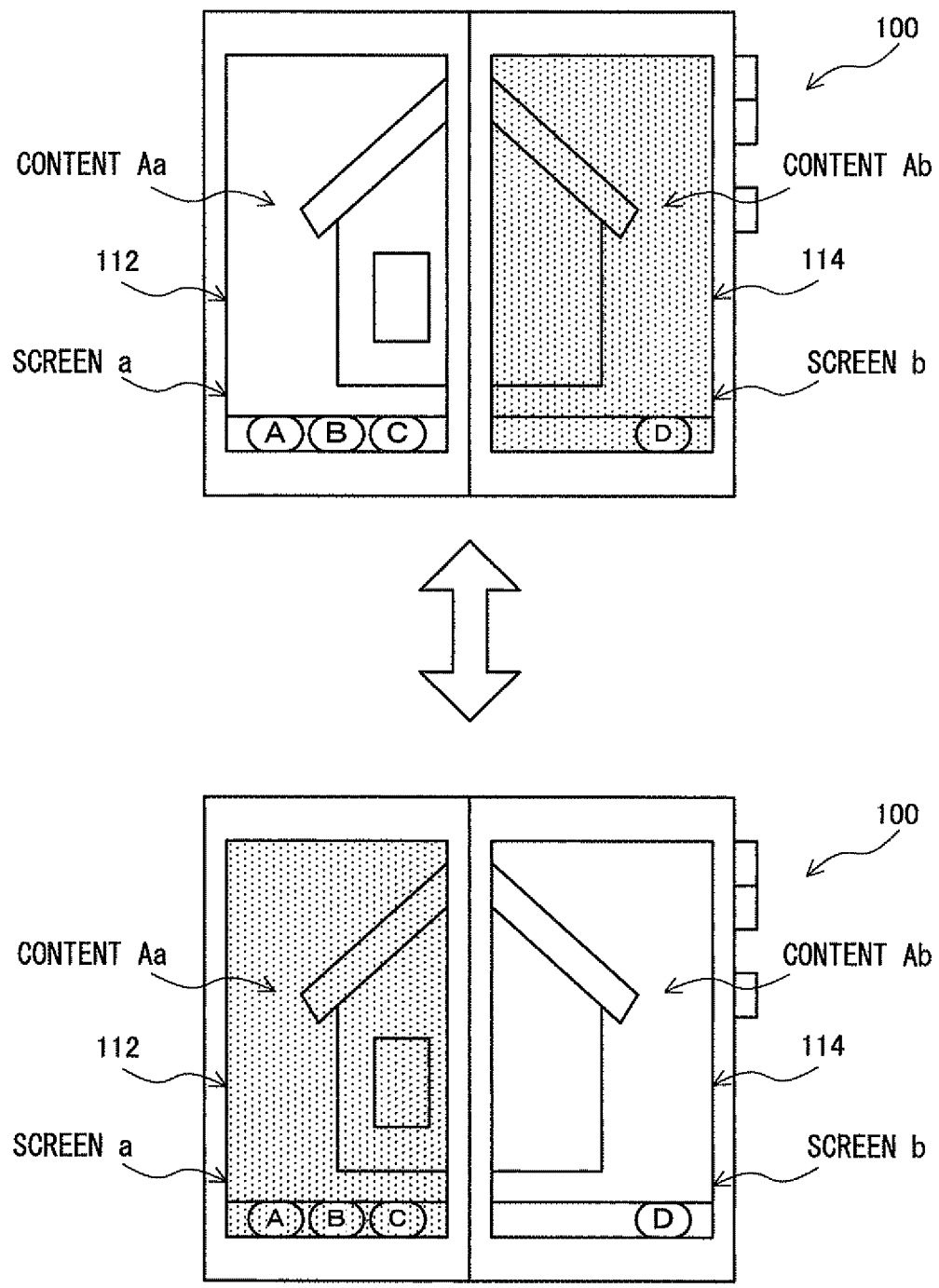
FIG. 16 is a diagram used for explanations of the processes according to the second exemplary embodiment.

On the other hand, when the user taps the first display unit 112 again within the predetermined time and the selection-operation reception unit 214 receives the tap operation, the display control unit 204 again controls a state of the display units so that the brightness of the display of the first display unit 112 is brighter than that of the second display unit 114 and the brightness of the display of the second display unit 114 is brighter than that of the first display unit 112 alternately every predetermined time (e.g. 0.2 every seconds), as shown in FIG. 16 as an example.

In other words, the display control unit 204 firstly makes the brightness of the display of the first display unit 112 brighter than that of the second display unit 114 and then makes the brightness of the display of the second display unit 114 brighter than that of the first display unit 112 when 0.2 seconds and the like elapse. Furthermore, when 0.2 seconds elapse, the display control unit 204 makes the brightness of the display of the first display unit 112 brighter than that of the second display unit 114. Afterwards, the display control unit 204 repeatedly makes one display brighter and the other darker. When a tap operation is not performed for a predetermined time (for example, for five seconds) in this state, the selection unit 212 selects the "first display unit 112 and second display unit 114" and "no combining".

On the other hand, when the user taps the first display unit 112 again within the predetermined time (for example, within five seconds) and the selection-operation reception unit 214 receives the tap operation, the display control unit 204 performs control so that the first display unit 112 and the second display unit 114 are equally illuminated as shown in FIG. 15A as an example. When a tap operation is not performed for a predetermined time (for example for five seconds) in this state, the selection unit 212 selects the "first display unit 112 and second display unit 114" and "combining".

In this way, because the displays of the first display unit 112 and the second display unit 114 change each time the user performs the selection operation (e.g. tap operation), the user can easily understand which display unit will be selected if the user does not perform the selection operation for the predetermined time in this state (in other words, which display unit is a candidate to be selected).

Next, the control unit 200 determines whether the selection operation of the display unit has been finished or not (S206). Specifically, as mentioned above, the selection unit 212 determines whether no selection operation has been performed for the predetermined time or not. When it is determined that the selection operation of the display unit has not been finished (that is, when the selection operation has been performed within the predetermined time) (NO at S206), the control unit 200 repeats the process of S204.

On the other hand, when it is determined that the selection operation of the display unit has been finished (that is, when the selection operation has not been performed within the predetermined time) (YES at S206), the control unit 200 determines which display unit of the first display unit 112 and the second display unit 114 has been selected (S208). Specifically, the display-screen acquisition unit 210 determines whether the selection unit 212 has selected the "first display unit 112", "second display unit 114" or the "first display unit 112 and second display unit 114".

When it is determined that the "first display unit 112" has been selected ("FIRST" at S208), the control unit 200 acquires the screen data indicating the screen displayed on the first display unit 112 (S210). Specifically, the display-screen acquisition unit 210 acquires the screen data which indicates the screen displayed on the first display unit 112 in a way similar to the process of S110 of the first exemplary embodiment. Next, the control unit 200 generates the image data corresponding to the screen displayed on the first display unit 112 (S212). Specifically, the image-data generation unit 220 performs necessary processes, such as conversion of data format, for the screen data acquired by the display-screen acquisition unit 210, and thereby generates the image data.

Figure 17A:
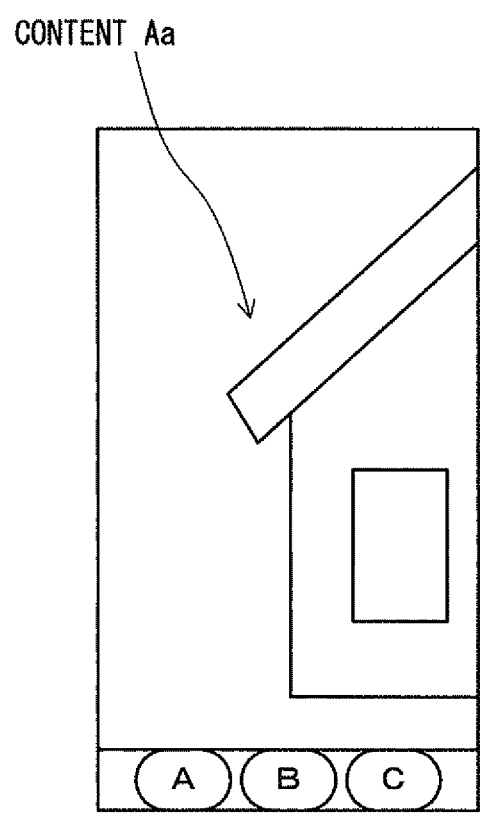
FIG. 17A is a diagram used for explanations of the processes according to the second exemplary embodiment.

For example, in a case where the screen which includes the content Aa, which is a part of the content A, is displayed on the first display unit 112 and the screen which includes the content Ab, which is a part of the content A, is displayed on the second display unit 114, as shown in FIG. 8 as an example, when the first display unit 112 has been selected as shown in FIG. 15B as an example, the image-data generation unit 220 generates the image data which indicates the image of the screen including the content Aa, as shown in FIG. 17A as an example.

Next, the image-data storage unit 222 of the control unit 200 stores the image data, which is generated by the image-data generation unit 220, in the memory 148 (S214).

On the other hand, when it is determined that the "second display unit 114" has been selected ("SECOND" at S208), the control unit 200 acquires the screen data indicating the screen displayed on the second display unit 114 (S220). Specifically, the display-screen acquisition unit 210 acquires the screen data which indicates the screen displayed on the second display unit 114 in a way similar to the process of S120 of the first exemplary embodiment. Next, the control unit 200 generates the image data corresponding to the screen displayed on the second display unit 114 (S222). Specifically, the image-data generation unit 220 performs necessary processes, such as conversion of data format, for the screen data acquired by the display-screen acquisition unit 210, and thereby generates the image data.

Figure 17B:
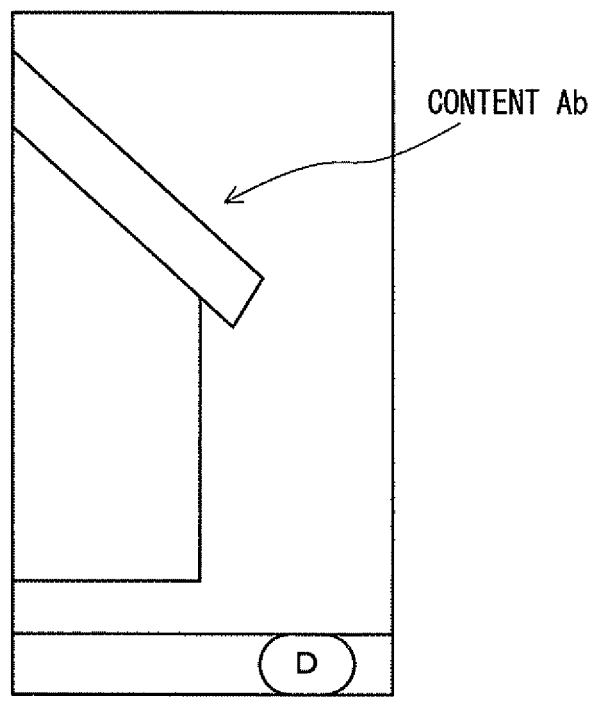
FIG. 17B is a diagram used for explanations of the processes according to the second exemplary embodiment.

For example, in a case where the screen which includes the content Aa, which is a part of the content A, is displayed on the first display unit 112 and the screen which includes the content Ab, which is a part of the content A, is displayed on the second display unit 114, as shown in FIG. 8 as an example, when the second display unit 114 has been selected as shown in FIG. 15C as an example, the image-data generation unit 220 generates the image data which indicates the image of the screen including the content Aa, as shown in FIG. 17B as an example.

Next, the image-data storage unit 222 of the control unit 200 stores the image data, which is generated by the image-data generation unit 220, in the memory 148 (S214).

On the other hand, when it is determined that the "first display unit 112 and second display unit 114" have been selected ("BOTH" at S208), the control unit 200 determines whether to combine the screens displayed on both of the display units (S230). Specifically, the display-screen acquisition unit 210 determines whether the selection unit 212 has selected the "combining" or the "no combining".

When it is determined that the screens are combined (YES at S230), the control unit 200 acquires two screen data indicating the screens which are respectively displayed on both the first display unit 112 and the second display unit 114 in a way similar to the process of S132 of the first exemplary embodiment (S240). Next, the control unit 200 generates the image data corresponding to the screens displayed on the first display unit 112 and the second display unit 114 in a way similar to the process of S134 of the first exemplary embodiment (S242). Specifically, the image-data generation unit 220 combines two screen data acquired by the display-screen acquisition unit 210. The image-data generation unit 220 performs the necessary processes such as the conversion of data format for the screen data where the screen data are combined to become one data, and thereby generates the image data.

For example, in a case where, as shown in FIG. 8 as an example, the screen a which includes the content Aa is displayed on the first display unit 112 and the screen b which includes the content Ab is displayed on the second display unit 114, when both the first display unit 112 and the second display unit 114 have been selected and it is selected to combine the screens of both of them, as shown in FIG. 15A as an example, then the image-data generation unit 220 generates an image data indicating an image into which the screen a and the screen b are combined as shown in FIG. 11 as an example. That is, the content A has been displayed separately on two display units by the application A which is one application as shown in FIG. 8 as an example, but the image data generated by the display screen acquisition process is in a state where the images are combined into one instead of remaining separated, as shown in FIG. 11 as an example.

Next, the image-data storage unit 222 of the control unit 200 stores the image data, which is generated by the image-data generation unit 220, in the memory 148 (S214).

On the other hand, when it is determined that the screens are not combined (NO at S230), the control unit 200 acquires two screen data indicating the screens which are respectively displayed on both the first display unit 112 and the second display unit 114 (S250). Specifically, the display-screen acquisition unit 210 acquires the screen data indicating the screen which is displayed on the first display unit 112 in a way similar to the process of S110 of the first exemplary embodiment. Similarly, the display-screen acquisition unit 210 acquires the screen data indicating the screen which is displayed on the second display unit 114. For example, in an example of FIG. 8, the display-screen acquisition unit 210 acquires the screen data a indicating the screen a, which is displayed on the first display unit 112, including the content Aa. Similarly, the display-screen acquisition unit 210 acquires the screen data b indicating the screen b, which is displayed on the second display unit 114, including the content Ab.

Next, the image-data generation unit 220 separately generates the image data respectively corresponding to screens displayed on the first display unit 112 and the second display unit 114 (S252). Specifically, the image-data generation unit 220 performs necessary processes, such as conversion of data format, for the screen data which indicates the screen displayed on the first display unit 112, and thereby generates the image data. Similarly, the image-data generation unit 220 performs necessary processes, such as conversion of data format, for the screen data which indicates the screen displayed on the second display unit 114, and thereby generates the image data.

For example, in a case where, as shown in FIG. 8 as an example, the screen a which includes the content Aa is displayed on the first display unit 112 and the screen b which includes the content Ab is displayed on the second display unit 114, when both the first display unit 112 and the second display unit 114 have been selected and it is selected not to combine the screens of both of them, as shown in FIG. 16 as an example, then, as shown in FIGS. 17A and 17B as an example, the image-data generation unit 220 separately generates an image data which indicates the image of the screen including the content Aa (FIG. 17A) and an image data which indicates the image of the screen including the content Ab (FIG. 17B). Next, the image-data storage unit 222 of the control unit 200 stores two image data, which are generated by the image-data generation unit 220, in the memory 148 (S214).

In this way, the user can repeat the selection operation (e.g. tap operation) to select the desired screen depending on the number of times the selection operation is performed. Moreover, the user can also select whether to combine a plurality of the screens or not. In the example of FIGS. 15A to 15C and 16, for example, it is assumed that the display units are initially in the state of FIG. 15A. When the user performs the selection operation once in this state, the state of the display units becomes the state of FIG. 15B. Accordingly, the selection unit 212 selects the first display unit 112. That is, the display-screen acquisition unit 210 can acquire the display screen of the first display unit 112. When the user performs the selection operation twice, the state of the display units becomes the state of FIG. 15C. Accordingly, the selection unit 212 selects the second display unit 114. That is, the display-screen acquisition unit 210 can acquire the display screen of the second display unit 114.

When the user performs the selection operation three times, the state of the display units becomes the state of FIG. 16. Accordingly, the selection unit 212 selects the first display unit 112 and the second display unit 114. That is, the display-screen acquisition unit 210 can acquire the display screen of the first display unit 112 and the display screen of the second display unit 114. The image-data generation unit 220 then can generate the image data separately for the display screen of the first display unit 112 and the display screen of the second display unit 114.

When the user performs the selection operation three times, the state of the display units becomes the state of FIG. 15A. Accordingly, the selection unit 212 selects the first display unit 112 and the second display unit 114. That is, the display-screen acquisition unit 210 can acquire the display screen of the first display unit 112 and the display screen of the second display unit 114. The image-data generation unit 220 then can generate the image data by combining the display screen of the first display unit 112 and the display screen of the second display unit 114.

Therefore, special operations and input key devices for the selection operation are unnecessary. Furthermore, when the selection operation has not been performed for the predetermined time, the display unit is selected and it is selected whether to combine the screens or not, automatically. Thus, the user can easily acquire the image data relating to a desired screen by only repeating one operation such as the tap operation.

In the above-mentioned second exemplary embodiment, the case where the content is displayed on both the first display unit 112 and the second display unit 114 by one application has been explained. However, the second exemplary embodiment can be applied to a state where the content is displayed on both the first display unit 112 and the second display unit 114 by different applications. Specifically, it is possible to replace the processes of S170 and S172 of the flowchart shown in FIG. 6 of the first exemplary embodiment with the processes corresponding to S230 to S252 of the flowchart shown in FIG. 14 of the second exemplary embodiment.

By this configuration, the display screen of the first display unit 112 and the display screen of the second display unit 114 are not always combined even if the content is displayed on both the first display unit 112 and the second display unit 114 by different applications and the user selects both of the display units. In other words, the user can select whether to combine or separate the display screen of the first display unit 112 and the display screen of the second display unit 114. Accordingly, as shown in FIG. 9 for example, in the state where the content is displayed on both the first display unit 112 and the second display unit 114 by different applications, when the user wants to acquire the display screens of the first display unit 112 and the second display unit 114 separately, then it is unnecessary for the user to perform troublesome processes such as selecting the first display unit 112 to generate the image data relating to the display screen of the first display unit 112 (FIG. 10A) and then selecting the second display unit 114 to generate the image data relating to the display screen of the second display unit 114 (FIG. 10A).

Modified Examples

Note that the present invention is not limited to the above-described exemplary embodiments, and they can be modified as desired without departing from the spirit and scope of the present invention. For example, in the above-described exemplary embodiments, there are two chassis. However, there may be one or more than two chassis. Further, in the above-described exemplary embodiments, there are two display units. However, there may be more than two display units.

Further, in the above-described exemplary embodiments, the operation body is the user's finger. However, the operation body is not limited to the user's finger. For example, the operation body may be a stylus pen and the like. Further, in the above-described exemplary embodiments, the selection operation is a tap operation. However, the selection operation is not limited to the tap operation. For example, the selection operation may be a flick operation or a push of the input key 120.

Further, two or more of the components shown in the above-described exemplary embodiments may be configured as one integrated component. For example, the display-screen acquisition unit 210 and the selection unit 212 may be integrated with each other, or, for example, the display-screen acquisition unit 210 may include a function of the selection unit 212.

Further, in the flowcharts shown in FIGS. 5, 6 and 14, the order of the processes (steps) can be changed as appropriate. Moreover, one process (step) may be performed during execution of the other process (step). Moreover, one or more of a plurality of the processes (steps) may be omitted.

Further, in the above-described exemplary embodiments, with reference to FIGS. 12A to 12C and 15A to 15C, the display unit which is not the selection candidate is displayed more darkly than the display unit which is the selection candidate. However, it is unnecessary to use the brightness of the display to distinguish between the selection candidate and the non-selection candidate. For example, the display control unit 204 may add a predetermined mark (e.g. a cross mark or a character such as "not selected", and the like) to the screen of the display unit which is not the selection candidate. Alternatively, for example, the display control unit 204 may add a predetermined mark (e.g. a circle or a character such as "selected", and the like) to the screen of the display unit which is the selection candidate.

Further, the above-described exemplary embodiments explain, with reference to FIGS. 12A to 12C, 15A to 15C and 16, that the state of the display of the display units and the selection candidate are changed depending on the number of times the selection operation is performed. However, the order of the changes is not limited to the orders shown in FIGS. 12A to 12C, 15A to 15C and 16. The order of the changes can be determined as desired by a person skilled in the art.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to a computer using any type of transitory computer readable media. Examples of transitory computer readable media include electric signals, optical signals, and electromagnetic waves. Transitory computer readable media can provide the program to a computer via a wired communication line, such as electric wires and optical fibers, or a wireless communication line.

Although the present invention has been explained with reference to the exemplary embodiments, the present invention is not limited by the above exemplary embodiments. Various modifications, obvious to those in the art, can be made to the configurations and details of the present invention within the scope of the invention.

This application is based upon and claims the benefit of priority from Japanese patent application No. 2013-42735, filed on Mar. 5, 2013, the disclosure of which is incorporated herein in its entirety by reference.

REFERENCE SIGNS LIST

1 MOBILE TERMINAL APPARATUS
2 FIRST DISPLAY UNIT
4 SECOND DISPLAY UNIT
6 DISPLAY CONTROL MEANS
8 SELECTION MEANS
10 DISPLAY-SCREEN ACQUISITION MEANS
12 IMAGE-DATA GENERATION MEANS
100 MOBILE TERMINAL APPARATUS
112 FIRST DISPLAY UNIT
114 SECOND DISPLAY UNIT
120 INPUT KEY
120a POWER SUPPLY BUTTON
120b VOLUME INCREASE BUTTON
120c VOLUME DECREASE BUTTON
146 STORAGE UNIT
148 MEMORY
200 CONTROL UNIT
202 APPLICATION EXECUTION UNIT
204 DISPLAY CONTROL UNIT
206 SCREEN-ACQUISITION-OPERATION RECEPTION UNIT
210 DISPLAY-SCREEN ACQUISITION UNIT
212 SELECTION UNIT
214 SELECTION-OPERATION RECEPTION UNIT
220 IMAGE-DATA GENERATION UNIT
222 IMAGE-DATA STORAGE UNIT

What is claimed is:

1. A mobile terminal apparatus comprising:
a plurality of displays configured to display images;
a memory storing instructions;
a processor configured to execute the instructions;
a display control unit implemented by the memory and the processor and that causes at least one of the plurality of the displays to display at least one content by using one or more application software;
an operation reception unit implemented by the memory and the processor and that receives a first operation by a user by tapping one display configured as touch screen;
a selection unit implemented by the memory and the processor and that selects one or more of the plurality of the displays; and
an image-data generation unit implemented by the memory and the processor and that captures a screen displayed on a display selected by the selection unit and generates image data indicating the captured screen;
wherein
the display control unit changes at least one display state of the plurality of the displays when the operation reception unit has received the first operation;
the display control unit controls the plurality of the displays so that a display state of a display that has been a candidate to be selected by the selection unit is different from a display state of a display that has not been the candidate to be selected by the selection unit, without changing the displays on which the images of candidate and not-candidate displays are displayed, when the display control unit changes the at least one display state of the plurality of the displays depending on the operation reception unit having received the first operation;
in response to determining that one content of one application software is displayed on at least two displays, the image-data generation unit captures at least two screens displayed on the at least two displays, and combines the at least two screens to generate one image data; and
in response to determining that contents of a plurality of application software are displayed respectively on the at least two displays, the selection unit selects at least one of the at least two displays, the image-data generation unit captures at least one screen displayed on the at least one selected display of the at least two displays, and, when the at least two displays are selected, the image-data generation unit combines the at least two screens to generate the one image data.

2. The mobile terminal apparatus according to claim 1, further comprising an operation reception unit implemented by the memory and the processor and that receives a first operation by a user,
wherein the selection unit selects the one or more of the plurality of the displays depending on a number of times that the operation reception unit has received the first operation.

3. The mobile terminal apparatus according to claim 2, wherein the selection unit selects the one or more of the plurality of the displays depending on the number of times that the operation reception unit has received the first operation when the display control unit causes the plurality of the displays to respectively display contents by using the plurality of application software.

4. The mobile terminal apparatus according to claim 2, wherein the selection unit selects the one or more of the plurality of the displays when the operation reception unit has not received a subsequent first operation within a predetermined time after receiving the first operation.

5. The mobile terminal apparatus according to claim 1, wherein
the at least one of the plurality of the displays is configured so that a display device and an input device are combined, and
the selection unit changes a display that is a candidate to be selected depending on an operation body touching the display device.

6. The mobile terminal apparatus according to claim 2, wherein, when the display control unit causes the plurality of the displays to display a content by using the one application software, the selection unit selects one or more of the plurality of the displays depending on the number of times that the operation reception unit has received the first operation, and further, if the selection unit selects two or more of the displays, the selection unit selects whether or not to combine screens respectively displayed, by the image-data generation unit, on the selected two or more displays.

7. An image generation method comprising:
causing at least one of a plurality of displays, that are provided in a mobile terminal apparatus and display images, to display a content by using one or more application software;

receiving a first operation by a user by tapping one display configured as touch screen;

changing at least one display state of the plurality of the displays when the operation reception unit has received the first operation;

controlling the plurality of the displays so that a display state of a display that has been a candidate to be selected is different from a display state of a display that has not been the candidate to be selected, without changing the displays on which the images of candidate and not-candidate displays are displayed, when changing the at least one display state of the plurality of the displays depending on having received the first operation;

selecting one or more of the plurality of the displays;

capturing a screen displayed on a selected display; and generating image data indicating the captured screen;

in response to determining that one content of one application software is displayed on at least two displays, capturing at least two screens displayed on the at least two displays, and combining the at least two screens to generate one image data; and in response to determining that contents of a plurality of application software are displayed respectively on the at least two displays, selecting at least one of the at least two displays, capturing at least one screen displayed on the at least one selected display of the at least two displays, and, when the at least two displays are selected, combining the at least two screens to generate the one image data.

8. The image generation method according to claim 7, comprising:

receiving a first operation by a user, selecting one or more of the plurality of the displays depending on a number of times of having received the first operation.

9. A non-transitory computer readable medium storing a program for causing a computer of a mobile terminal apparatus to execute:

a display step of causing at least one of a plurality of the displays, that are provided in the mobile terminal apparatus and display images, to display a content by using one or more application software;

an operation reception step of receiving a first operation by a user by tapping one display configured as touch screen;

a selection step of selecting one or more of the plurality of the displays; and an image-data generation step of capturing a screen displayed on a display selected by the selection unit and generating image data indicating the captured screen;

the display control step changes at least one display state of the plurality of the displays when the operation reception step has received the first operation;

the display control step controls the plurality of the displays so that a display state of a display that has been a candidate to be selected in the selection step is different from a display state of a display that has not been the candidate to be selected in the selection step, without changing the displays on which the images of candidate and not-candidate displays are displayed, when the display control step changes the at least one display state of the plurality of the displays depending on the operation reception step having received the first operation;

in response to determining that one content of one application software is displayed on at least two displays, a step of capturing at least two screens displayed on the at least two displays, and combining the at least two screens to generate one image data; and in response to determining that contents of a plurality of application software are displayed respectively on the at least two displays, a step of selecting at least one of the at least two displays, a step of capturing at least one screen displayed on the at least one selected display of the at least two displays, and, when the at least two displays are selected, a step of combining the at least two screens to generate the one image data.

10. The non-transitory computer readable medium storing the program according to claim 9, the program causing the computer of the mobile terminal apparatus to execute:

an operation reception step of receiving a first operation by a user, wherein the selection step selects one or more of the plurality of the displays depending on a number of times of having received the first operation in the operation reception step.

\* \* \* \* \*